(12) United States Patent
Pham et al.

(10) Patent No.: US 7,654,098 B2
(45) Date of Patent: Feb. 2, 2010

(54) COOLING SYSTEM WITH VARIABLE CAPACITY CONTROL

(75) Inventors: Hung M Pham, Dayton, OH (US);
Abtar Singh, Kennesaw, GA (US);
Jean-Luc Caillat, Dayton, OH (US);
Mark Bass, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 11/529,645

(22) Filed: Sep. 28, 2006

(65) Prior Publication Data

US 2007/0022771 A1 Feb. 1, 2007

Related U.S. Application Data

(60) Continuation of application No. 10/730,492, filed on Dec. 8, 2003, which is a division of application No. 10/306,030, filed on Nov. 27, 2002, now Pat. No. 6,679,072, which is a division of application No. 10/147,782, filed on May 16, 2002, now Pat. No. 6,499,305, which is a division of application No. 09/886,592, filed on Jun. 21, 2001, now Pat. No. 6,467,280, which is a division of application No. 09/524,364, filed on Mar. 14, 2000, now Pat. No. 6,408,635, which is a division of application No. 08/939,779, filed on Sep. 29, 1997, now Pat. No. 6,047,557, which is a continuation-in-part of application No. 08/486,118, filed on Jun. 7, 1995, now Pat. No. 5,741,120.

(51) Int. Cl.
*F25B 41/04* (2006.01)
*F25B 49/00* (2006.01)

(52) U.S. Cl. ............... 62/217; 62/222; 62/228.1

(58) Field of Classification Search ............ 62/217, 62/222, 228.1, 196.3
See application file for complete search history.

(56) References Cited

U.S. PATENT DOCUMENTS 3,578,883 A 5/1971 Cheney (Continued)

FOREIGN PATENT DOCUMENTS

CN 1042406 5/1990

(Continued)

OTHER PUBLICATIONS

Capacity Modulation for Air Conditioning and Refrigeration Systems; Air Conditioning, Heating & Refrigeration News; Earl B. Muir, Manager of Research, and Russell W. Griffith, Research Engineer, Copeland Corp.; Apr.-May 1979; 12 Pages.

(Continued)

*Primary Examiner*—Marc E Norman
(74) *Attorney, Agent, or Firm*—Harness, Dickey & Pierce, P.L.C.

(57) ABSTRACT

A system includes a scroll compressor having a first scroll member interleaved with a second scroll member to define at least two moving fluid pockets that decrease in size as they move from a radially outer position to a radially inner position. A valve in fluid communication with the compression chamber is movable between an open state allowing fluid to the compression chamber and a closed state preventing fluid to the compression chamber. A controller continuously cycles the valve between the open state and the closed state at a rate that is faster than a thermal time constant of a load on the system.

34 Claims, 16 Drawing Sheets

U.S. PATENT DOCUMENTS

| | | | |
|---|---|---|---|
| 3,653,783 | A | 4/1972 | Sauder |
| 3,759,057 | A | 9/1973 | English et al. |
| 4,149,827 | A | 4/1979 | Hofmann, Jr. |
| 4,152,902 | A | 5/1979 | Lush |
| 4,227,862 | A | 10/1980 | Andrew et al. |
| 4,231,713 | A | 11/1980 | Widdowson et al. |
| 4,362,475 | A | 12/1982 | Seitz |
| 4,396,345 | A | 8/1983 | Hutchinson |
| 4,406,589 | A | 9/1983 | Tsuchida et al. |
| 4,407,639 | A | 10/1983 | Maruyama |
| 4,419,866 | A | 12/1983 | Howland |
| 4,432,705 | A | 2/1984 | Fraser et al. |
| 4,459,817 | A | 7/1984 | Inagaki et al. |
| 4,463,576 | A | 8/1984 | Burnett et al. |
| 4,494,383 | A | 1/1985 | Nagatomo et al. |
| 4,506,517 | A * | 3/1985 | Pandzik .................. 62/175 |
| 4,506,518 | A | 3/1985 | Yoshikawa et al. |
| 4,575,318 | A | 3/1986 | Blain |
| 4,580,949 | A | 4/1986 | Maruyama et al. |
| 4,588,359 | A | 5/1986 | Hikade |
| 4,610,610 | A | 9/1986 | Blain |
| 4,612,776 | A | 9/1986 | Alsenz |
| 4,632,358 | A | 12/1986 | Orth et al. |
| 4,634,046 | A | 1/1987 | Tanaka |
| 4,638,973 | A | 1/1987 | Torrence |
| 4,651,535 | A | 3/1987 | Alsenz |
| 4,663,725 | A | 5/1987 | Johnson et al. |
| 4,669,272 | A | 6/1987 | Kawai et al. |
| 4,685,309 | A | 8/1987 | Behr |
| 4,697,431 | A | 10/1987 | Alsenz |
| 4,723,895 | A | 2/1988 | Hayase |
| 4,726,740 | A | 2/1988 | Suzuki et al. |
| 4,744,733 | A | 5/1988 | Terauchi et al. |
| 4,747,756 | A | 5/1988 | Sato et al. |
| 4,764,096 | A | 8/1988 | Sawai et al. |
| 4,789,025 | A | 12/1988 | Brandemuehl et al. |
| 4,831,832 | A | 5/1989 | Alsenz |
| 4,843,834 | A | 7/1989 | Inoue et al. |
| 4,856,291 | A | 8/1989 | Takahashi |
| 4,875,341 | A | 10/1989 | Brandemuehl et al. |
| 4,878,818 | A | 11/1989 | Shaw |
| 4,892,466 | A | 1/1990 | Taguchi et al. |
| 4,893,480 | A | 1/1990 | Matsui et al. |
| 4,896,860 | A | 1/1990 | Malone et al. |
| 4,909,043 | A | 3/1990 | Masauji et al. |
| 4,910,968 | A | 3/1990 | Yamashita et al. |
| 4,951,475 | A | 8/1990 | Alsenz |
| 4,962,648 | A | 10/1990 | Takizawa et al. |
| 4,968,221 | A | 11/1990 | Noll |
| 4,974,427 | A | 12/1990 | Diab |
| 5,006,045 | A | 4/1991 | Shimoda et al. |
| 5,007,247 | A | 4/1991 | Danig |
| 5,018,366 | A | 5/1991 | Tanaka et al. |
| 5,022,234 | A | 6/1991 | Goubeaux |
| 5,025,636 | A | 6/1991 | Terauchi |
| 5,035,119 | A | 7/1991 | Alsenz |
| 5,059,098 | A | 10/1991 | Suzuki et al. |
| 5,067,326 | A | 11/1991 | Alsenz |
| 5,079,929 | A | 1/1992 | Alsenz |
| 5,088,297 | A | 2/1992 | Maruyama et al. |
| 5,115,644 | A | 5/1992 | Alsenz |
| 5,163,301 | A | 11/1992 | Cahill-O'Brien et al. |
| 5,189,886 | A | 3/1993 | Terauchi |
| 5,190,446 | A | 3/1993 | Salter et al. |
| 5,191,643 | A | 3/1993 | Alsenz |
| 5,199,855 | A | 4/1993 | Nakajima et al. |
| 5,203,179 | A | 4/1993 | Powell |
| 5,226,472 | A * | 7/1993 | Benevelli et al. ........... 165/263 |
| 5,228,301 | A | 7/1993 | Sjoholm et al. |
| 5,243,827 | A | 9/1993 | Hagita et al. |
| 5,247,989 | A | 9/1993 | Benevelli |
| 5,253,482 | A | 10/1993 | Murway |
| 5,259,210 | A | 11/1993 | Ohya et al. |
| 5,265,434 | A | 11/1993 | Alsenz |
| 5,282,329 | A | 2/1994 | Teranishi |
| 5,282,729 | A | 2/1994 | Swain |
| 5,319,943 | A | 6/1994 | Bahel et al. |
| 5,342,186 | A | 8/1994 | Swain |
| 5,363,649 | A | 11/1994 | McBurnett et al. |
| 5,381,669 | A | 1/1995 | Bahel et al. |
| 5,388,968 | A | 2/1995 | Wood et al. |
| 5,392,612 | A | 2/1995 | Alsenz |
| 5,415,008 | A | 5/1995 | Bessler |
| 5,425,246 | A | 6/1995 | Bessler |
| 5,431,026 | A | 7/1995 | Jaster |
| 5,438,844 | A | 8/1995 | Tuten, III et al. |
| 5,440,891 | A | 8/1995 | Hindmon, Jr. et al. |
| 5,440,894 | A | 8/1995 | Schaeffer et al. |
| 5,447,420 | A | 9/1995 | Caillat et al. |
| 5,463,876 | A | 11/1995 | Bessler et al. |
| 5,492,450 | A | 2/1996 | Bearint et al. |
| 5,493,867 | A | 2/1996 | Szynal et al. |
| 5,502,970 | A | 4/1996 | Rajendran |
| 5,507,316 | A | 4/1996 | Meyer |
| 5,515,267 | A | 5/1996 | Alsenz |
| 5,533,873 | A | 7/1996 | Kindl |
| 5,540,061 | A | 7/1996 | Gommori et al. |
| 5,540,558 | A | 7/1996 | Harden et al. |
| 5,546,756 | A | 8/1996 | Ali |
| 5,562,426 | A | 10/1996 | Watanabe et al. |
| 5,572,879 | A | 11/1996 | Harrington et al. |
| 5,611,674 | A | 3/1997 | Bass et al. |
| 5,613,841 | A | 3/1997 | Bass et al. |
| 5,634,350 | A * | 6/1997 | De Medio .................. 62/217 |
| 5,735,134 | A | 4/1998 | Liu et al. |
| 5,741,120 | A | 4/1998 | Bass et al. |
| 5,807,081 | A | 9/1998 | Schutte et al. |
| 6,047,556 | A | 4/2000 | Lifson |
| 6,047,557 | A | 4/2000 | Pham et al. |
| 6,086,335 | A | 7/2000 | Bass et al. |
| 6,206,652 | B1 * | 3/2001 | Caillat .................. 417/298 |
| 6,393,852 | B2 | 5/2002 | Pham et al. |
| 6,401,472 | B2 | 6/2002 | Pollrich et al. |
| 6,408,635 | B1 | 6/2002 | Pham et al. |
| 6,431,210 | B1 | 8/2002 | Lowe et al. |
| 6,438,974 | B1 | 8/2002 | Pham et al. |
| 6,449,972 | B2 | 9/2002 | Pham et al. |
| 6,467,280 | B2 | 10/2002 | Pham et al. |
| 6,499,305 | B2 | 12/2002 | Pham et al. |
| 6,575,710 | B2 | 6/2003 | Wallis |
| 6,662,578 | B2 | 12/2003 | Pham et al. |
| 6,662,583 | B2 | 12/2003 | Pham et al. |
| 6,679,072 | B2 | 1/2004 | Pham et al. |
| 6,715,999 | B2 | 4/2004 | Ancel et al. |
| 6,971,861 | B2 | 12/2005 | Black et al. |
| 7,331,767 | B2 | 2/2008 | Spiegl et al. |
| RE40,400 | E | 6/2008 | Bass et al. |
| RE40,554 | E | 10/2008 | Bass et al. |
| 2001/0001463 | A1 | 5/2001 | Hayasaki et al. |
| 2001/0003573 | A1 | 6/2001 | Kimura et al. |
| 2001/0031207 | A1 | 10/2001 | Maeda et al. |
| 2002/0182087 | A1 | 12/2002 | Okii et al. |
| 2002/0195151 | A1 | 12/2002 | Erickson et al. |
| 2003/0070441 | A1 | 4/2003 | Moon et al. |
| 2004/0079096 | A1 | 4/2004 | Itoh et al. |
| 2004/0093881 | A1 | 5/2004 | Kim |
| 2004/0231348 | A1 | 11/2004 | Murase et al. |
| 2006/0218959 | A1 | 10/2006 | Sandkoetter |
| 2008/0131297 | A1 | 6/2008 | Hibino et al. |

FOREIGN PATENT DOCUMENTS

| | | |
|---|---|---|
| CN | 1137614 | 12/1996 |
| CN | 1159555 | 9/1997 |

| | | | |
|---|---|---|---|
| DE | 42 12 162 | | 10/1993 |
| EP | 0085246 | A1 | 8/1983 |
| EP | 0 281 317 | | 2/1988 |
| EP | 0 747 597 | | 12/1996 |
| EP | 0747597 | A2 | 12/1996 |
| EP | 0747598 | A2 | 12/1996 |
| EP | 1 489 368 | A2 | 12/2004 |
| EP | 1 710 435 | A1 | 10/2006 |
| GB | 733511 | A | 7/1955 |
| JP | S57-162988 | | 4/1981 |
| JP | 57204381 | | 12/1982 |
| JP | S58-214644 | | 12/1983 |
| JP | 59145392 | | 8/1984 |
| JP | 62-003190 | | 6/1985 |
| JP | S61-107989 | | 7/1986 |
| JP | 62-003191 | | 1/1987 |
| JP | S62-29779 | * | 2/1987 |
| JP | S62-125262 | * | 6/1987 |
| JP | S62-125263 | | 6/1987 |
| JP | 63-138490 | | 9/1988 |
| JP | S61-138490 | * | 9/1988 |
| JP | 6 207602 | | 7/1994 |
| JP | 719050 | A | 7/1995 |
| JP | H8-284842 | | 10/1996 |
| WO | 2005/022053 | A1 | 3/2005 |

OTHER PUBLICATIONS

Judgment—Bd.R. 127(b), *Jean-Luc Caillat* v. *Alexander Lifson*, Patent Interference No. 105,288; Jul. 5, 2005; 3 Pages.

Ashrae Handbook & Product Directory, 1979 Equipment, American Society of Heating, Refrigerating and Air-Conditioning Engineers, Inc., 1979, 6 Pages.

Maintenance Manual, Thermo King Corp., SB-III SR + uP IV +, 1995, 3 Pages.

Rejection Decision regarding CN200510064854.7 dated Feb. 6, 2009.

First Office Action dated Jul. 4, 2008 regarding Application No. 200610128576.1, received from the Patent Office of the People's Republic of China translated by CCPIT Patent and Trademark Law Office.

Second Office Action dated Apr. 17, 2009 regarding Application No. 200610128576.1 received from the Patent Office of the People's Republic of China translated by CCPIT and Trademark Law Office.

Notification of Second Office Action received from the Patent Office of the People's Republic of China dated May 5, 2009 regarding Application No. 200410085953.9, translated by CCPIT Patent and Trademark Office.

Extended European Search Report regarding Application No. EP 05016504 dated May 25, 2009.

Communication pursuant to Article 94(3) EPC received from the European Patent Office regarding Application No. 04 022920.5-2301 dated Jun. 15, 2009.

Third Office Action dated Aug. 21, 2009 regarding Application No. 200610128576.1 received from the Patent Office of the People's Republic of China translated by CCPIT and Trademark Law Office.

* cited by examiner

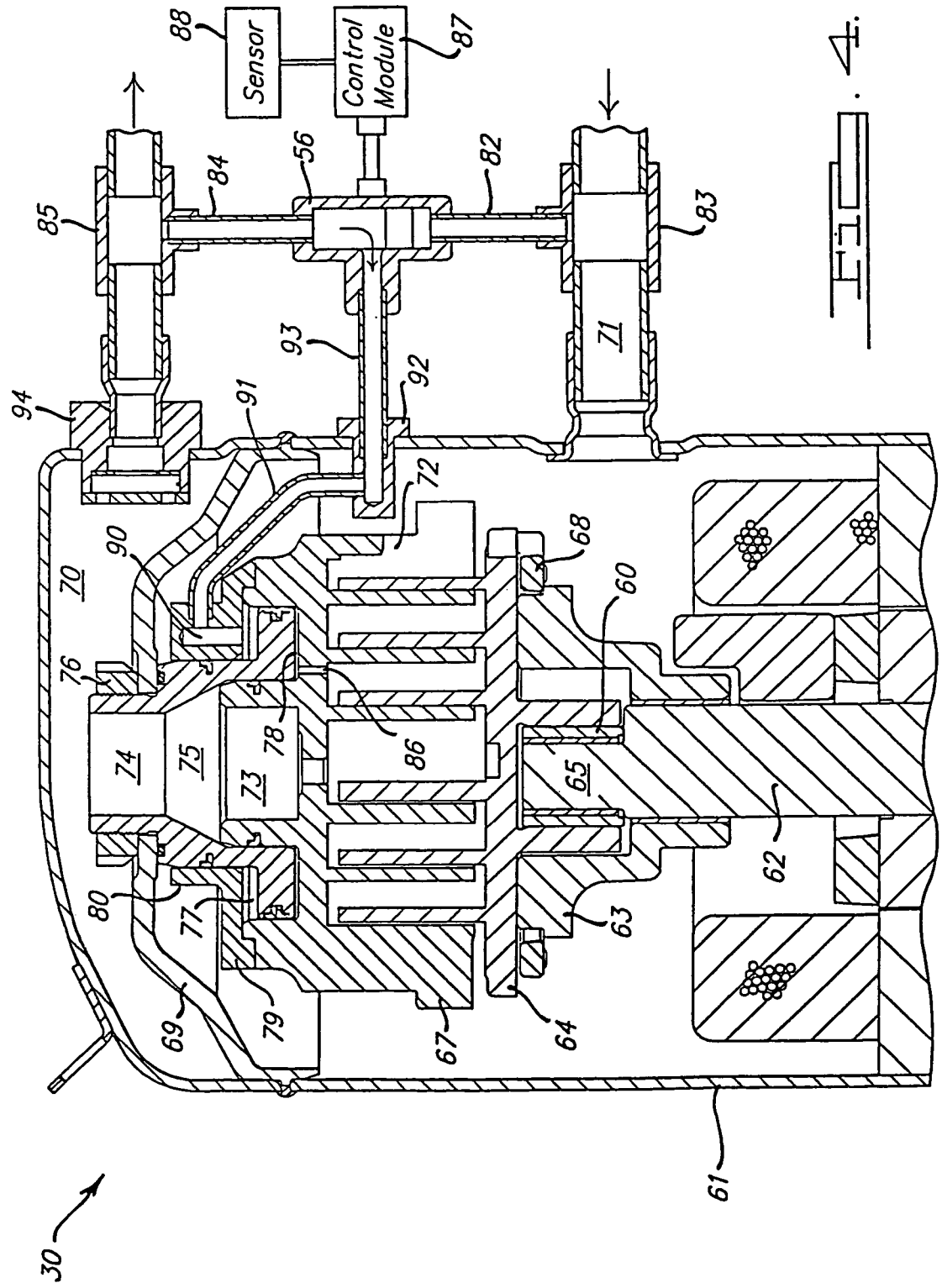

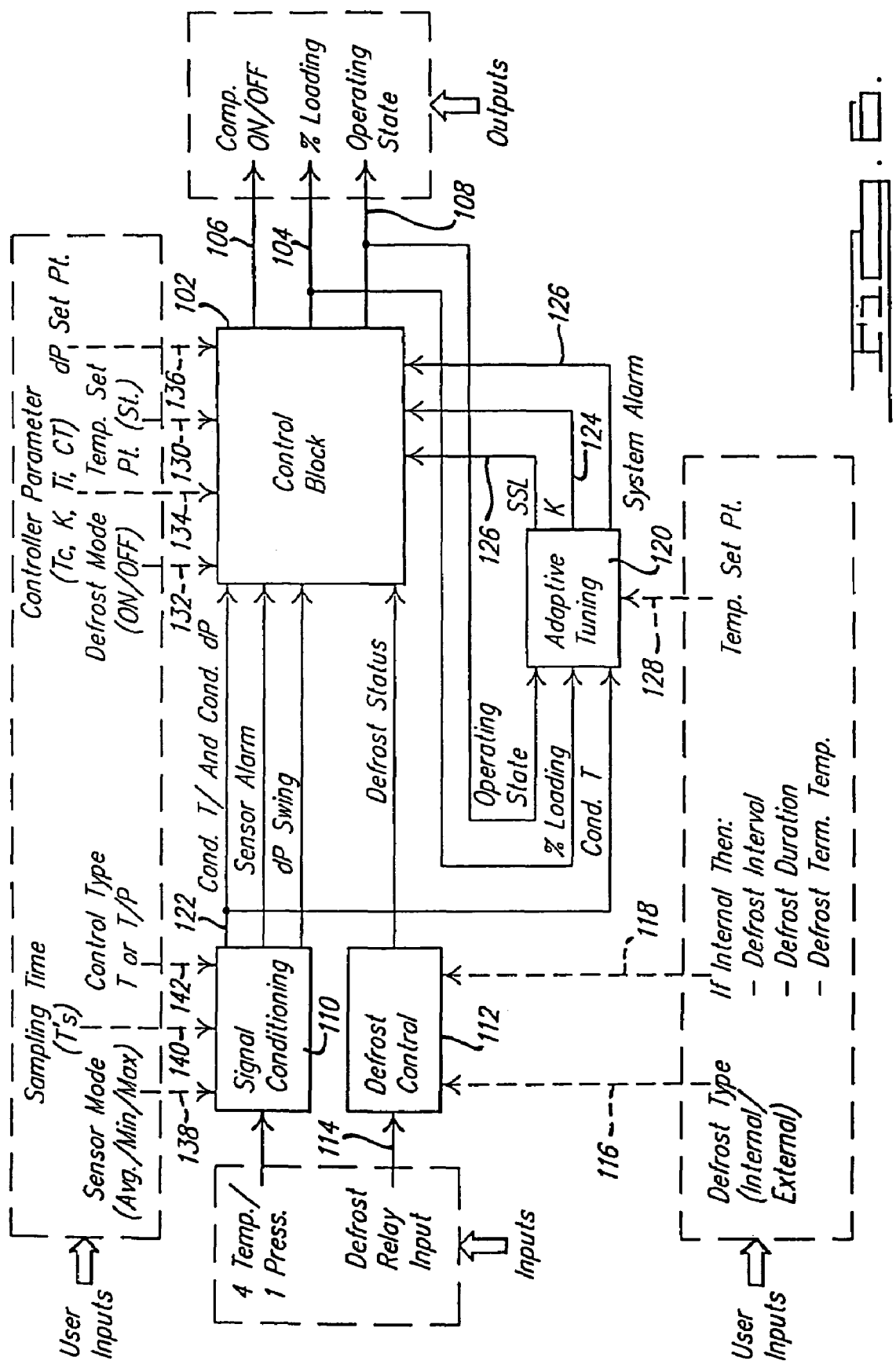

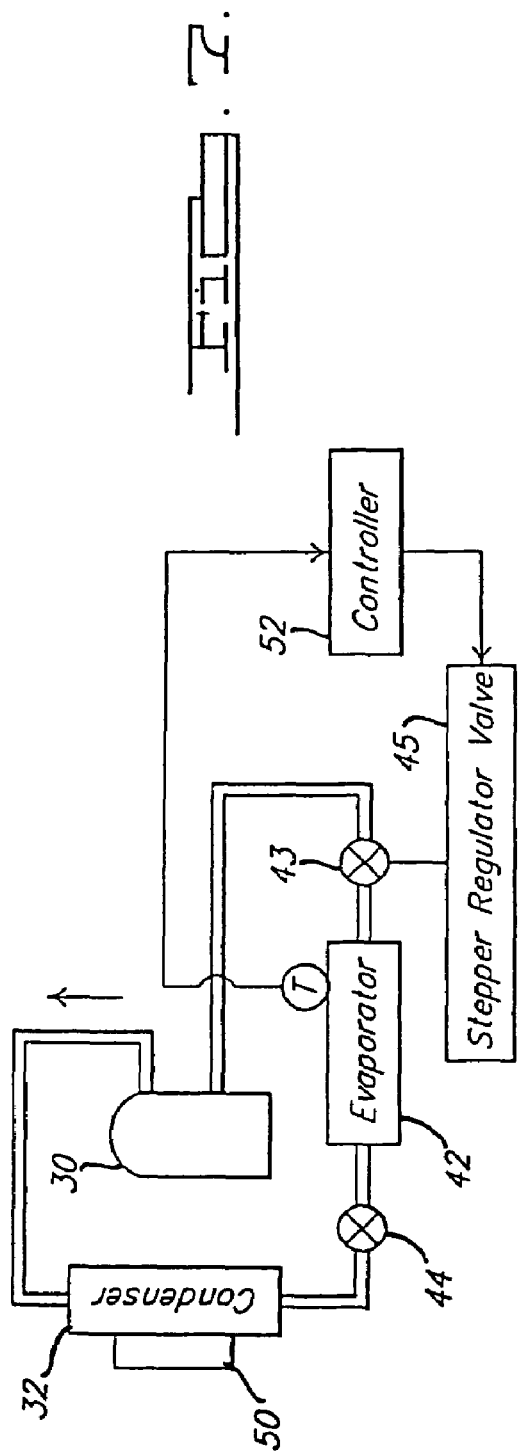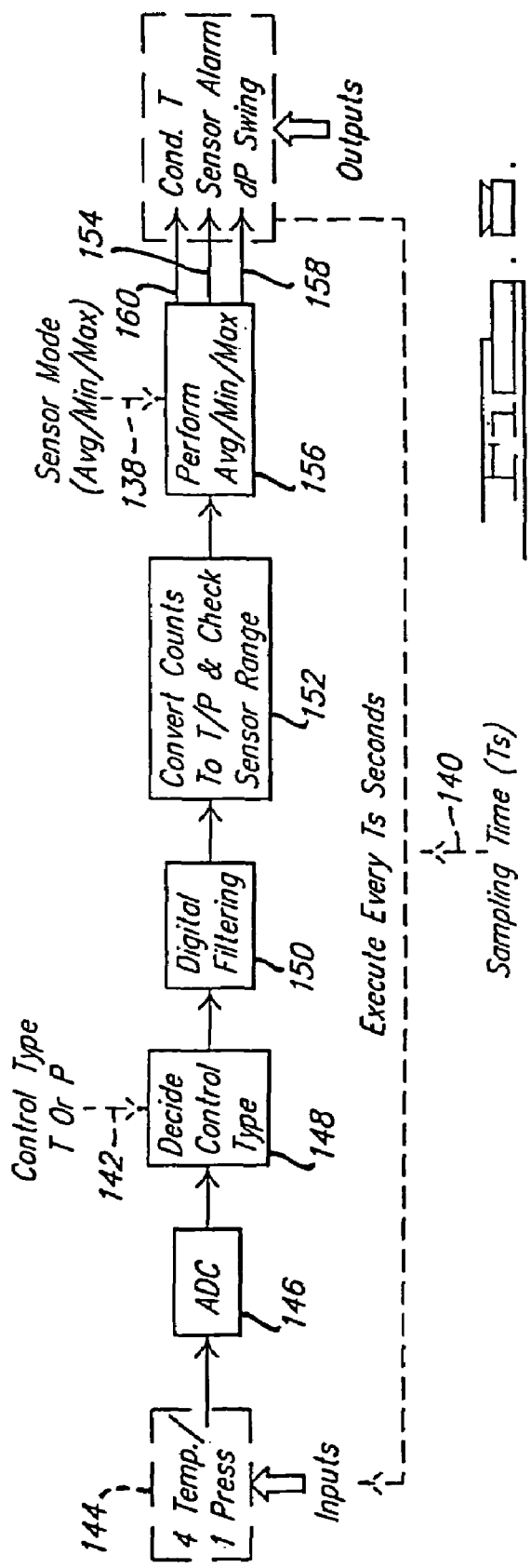

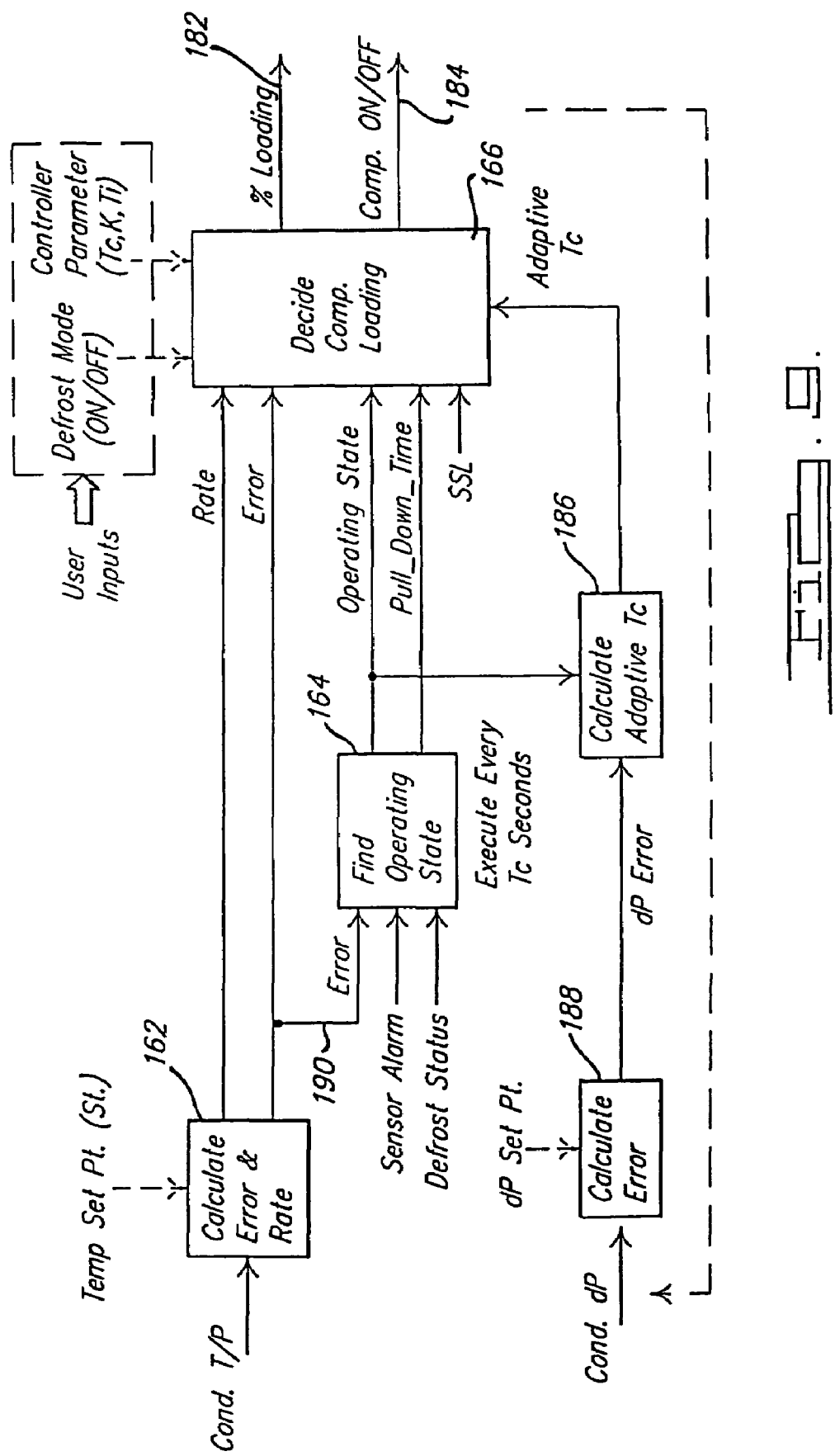

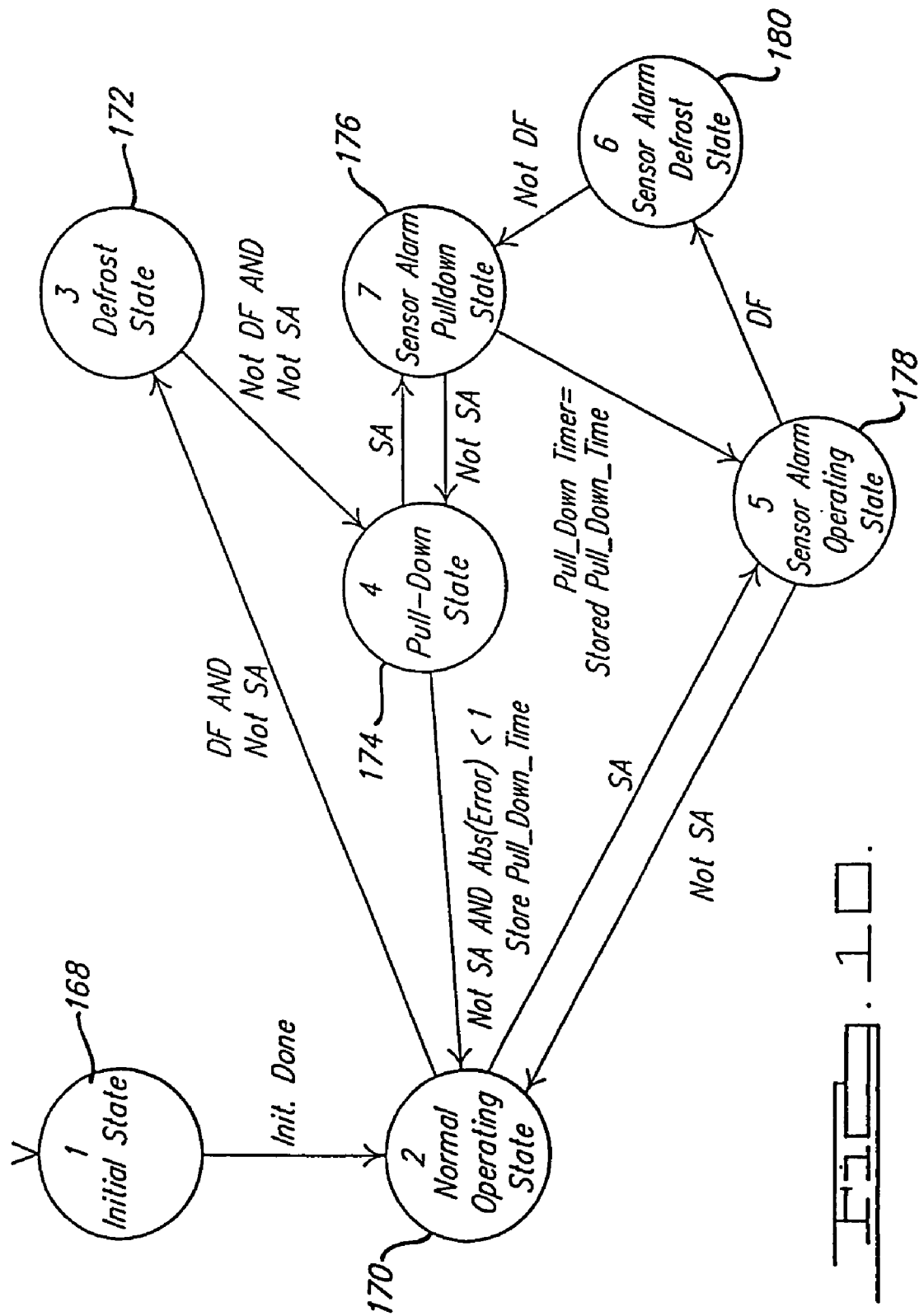

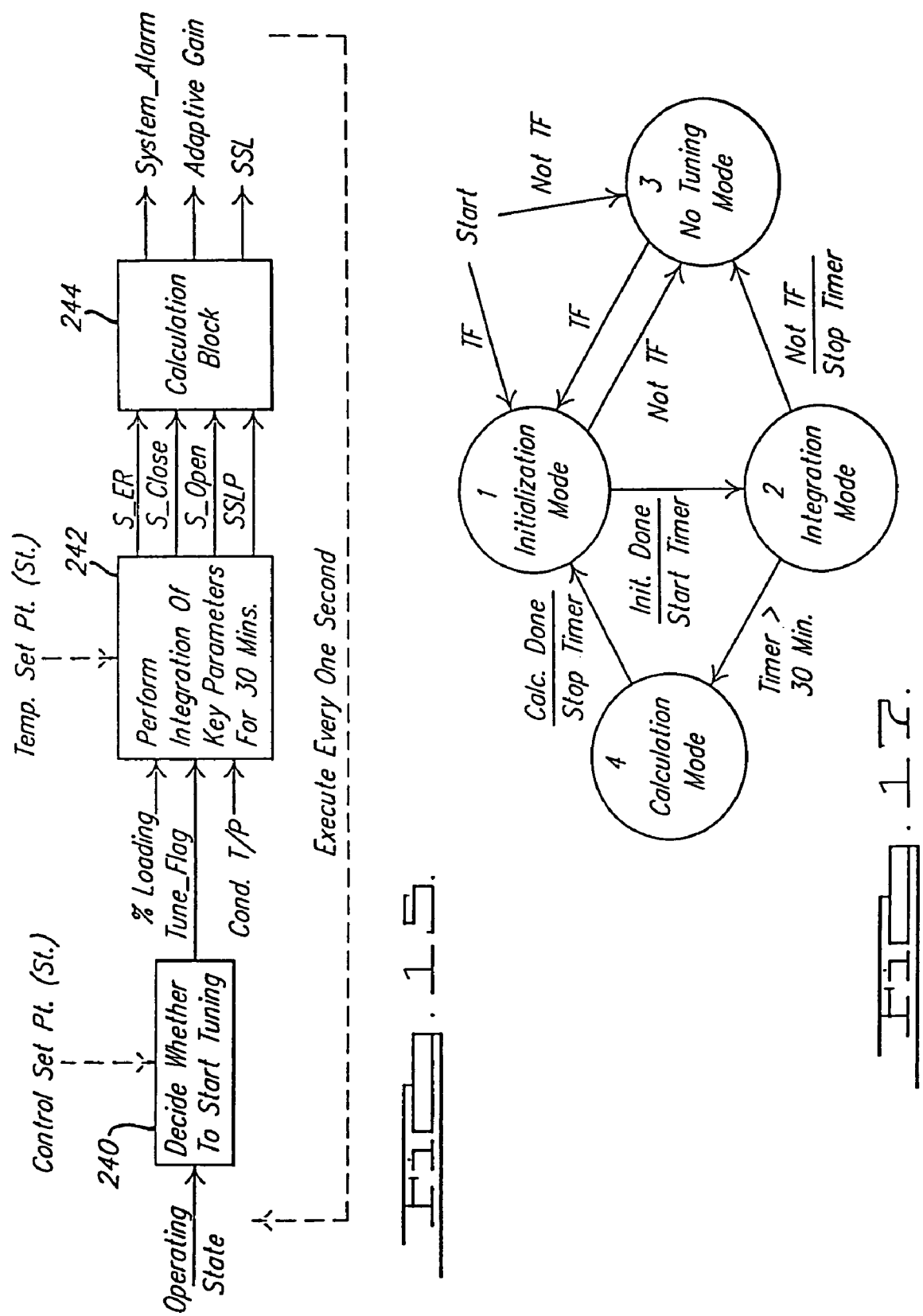

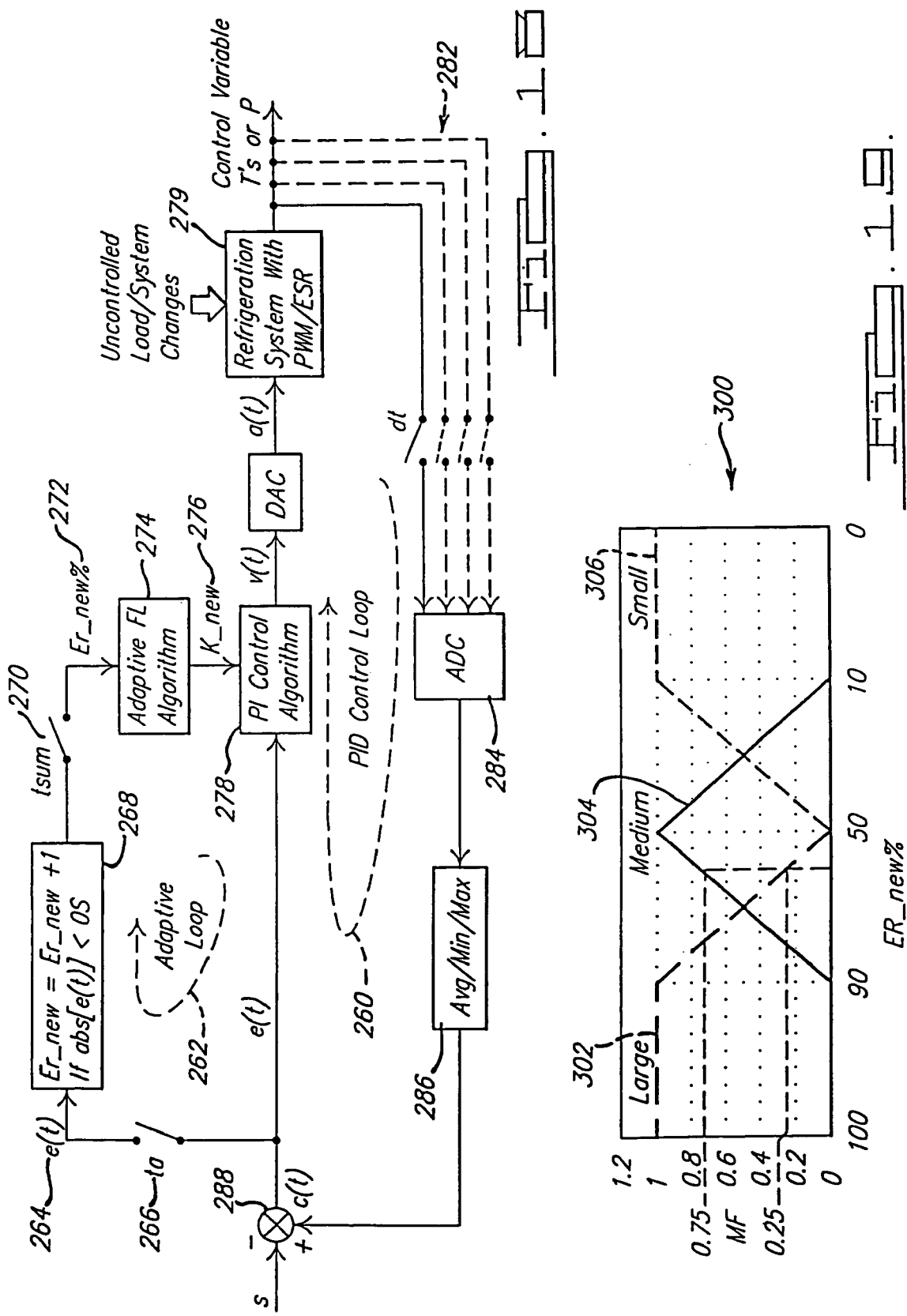

COOLING SYSTEM WITH VARIABLE CAPACITY CONTROL

CROSS-REFERENCE TO RELATED APPLICATIONS

This is a continuation of Ser. No. 10/730,492, filed Dec. 8, 2003; which is a division of U.S. Ser. No. 10/306,030, filed Nov. 27, 2002, now U.S. Pat. No. 6,679,072; which is a division of U.S. Ser. No. 10/147,782, filed May 16, 2002, now U.S. Pat. No. 6,499,305; which is a division of U.S. Ser. No. 09/886,592, filed Jun. 21, 2001, now U.S. Pat. No. 6,467,280; which is a division of U.S. Ser. No. 09/524,364, filed Mar. 14, 2000, now U.S. Pat. No. 6,408,635; which is a division of U.S. Ser. No. 08/939,779, filed Sep. 29, 1997, now U.S. Pat. No. 6,047,557; which is a continuation-in-part of U.S. Ser. No. 08/486,118, filed Jun. 7, 1995, now U.S. Pat. No. 5,741,120; each of which is incorporated herein by reference in its entirety.

BACKGROUND AND SUMMARY OF THE INVENTION

The present invention relates generally to cooling systems, compressor control systems and refrigerant regulating valve control systems. More particularly, the invention relates to a refrigeration system employing a pulse width modulated compressor or evaporator stepper regulator controlled by a variable duty cycle signal derived from a load sensor. Preferably an adaptive controller generates the variable duty cycle signal. The compressor has two mechanical elements separated by a seal, and these mechanical elements are cyclically movable relative to one another to develop fluid pressure. The compressor includes a mechanism to selectively break the seal in response to the control signal, thereby modulating the capacity of the system.

The refrigeration system can be deployed as a distributed system in refrigeration cases and the like. The preferred arrangement allows the compressor and condenser subsystems to be disposed in or mounted on the refrigeration case, thereby greatly reducing the length of refrigerant conduit and refrigerant required.

Conventionally, refrigeration systems for supermarket refrigeration cases have employed air-cooled or water-cooled condensers fed by a rack of compressors. The compressors are coupled in parallel so that they may be switched on and off in stages to adjust the system cooling capacity to the demands of the load. Commonly, the condensers are located outside, on the roof, or in a machine room adjacent the shopping area where the refrigeration cases are located.

Within each refrigeration case is an evaporator fed by lines from the condensers through which the expanded refrigerant circulates to cool the case. Conventionally, a closed-loop control system regulates refrigerant flow through the evaporator to maintain the desired case temperature. Proportional-integral-derivative (PID) closed loop control systems are popular for this purpose, with temperature sensors and/or pressure sensors providing the sensed condition inputs.

It is common practice within supermarkets to use separate systems to supply different individual cooling temperature ranges: low temperature (for frozen foods, ice cream, nominally −25 F); medium (for meat, dairy products, nominally +20 F); high (for floral, produce, nominally +35 to +40 F). The separate low, medium and high temperature systems are each optimized to their respective temperature ranges. Normally, each will employ its own rack of compressors and its own set of refrigerant conduits to and from the compressors and condensers.

The conventional arrangement, described above, is very costly to construct and maintain. Much of the cost is associated with the long refrigerant conduit runs. Not only are long conduit runs expensive in terms of hardware and installation costs, but the quantity of refrigerant required to fill the conduits is also a significant factor. The longer the conduit run, the more refrigerant required. Adding to the cost are environmental factors. Eventually fittings leak, allowing the refrigerant to escape to atmosphere. Invariably, long conduit runs involve more pipefitting joints that may potentially leak. When a leak does occur, the longer the conduit run, the more refrigerant lost.

There is considerable interest today in environmentally friendly refrigeration systems. Shortening the conduit run is seen as one way to achieve a more environmentally friendly system. To achieve this, new condenser/compressor configurations and new control systems will need to be engineered.

Re-engineering condenser/compressor configurations for more environmentally friendly systems is not a simple task, because system efficiency should not be sacrificed. Generally, the conventional roof-mounted condenser system, supplied by condensers, benefits from economies of scale and is quite efficient. These systems serve as the benchmark against which more environmentally friendly systems of the future will need to be measured.

To appreciate why re-engineering an environmentally yet efficient system has proven so difficult, consider these thermodynamic issues. The typical refrigeration case operates in a very unpredictable environment. From a design standpoint, the thermal mass being cooled is rarely constant. Within the supermarket environment, the temperature and humidity may vary widely at different times of day and over different seasons throughout the year. The product load (items in the refrigeration case) can also change unpredictably. Customers removing product and store clerks replenishing product rarely synchronize. Outside the supermarket environment, the outdoor air temperature and humidity may also vary quite widely between day and night and/or between summer and winter. The capacity of the system must be designed for the harshest conditions (when the condenser environment is the hottest). Thus systems may experience excess capacity in less harsh conditions, such as in the cool evenings or during the winter.

Periodic defrosting also introduces thermal fluctuations into the system. Unlike thermal fluctuations due to environmental conditions, the thermal fluctuations induced by the defrost cycle are caused by the control system itself and not by the surrounding environment.

In a similar fashion, the control system for handling multiple refrigeration cases can induce thermal fluctuations that are quite difficult to predict. If all cases within a multi-case system are suddenly turned on at once—to meet their respective cooling demands—the cooling capacity must rapidly be ramped up to maximum. Likewise, if all cases are suddenly switched off, the cooling capacity should be ramped down accordingly. However, given that individual refrigeration cases may operate independently of one another, the instantaneous demand for cooling capacity will tend to vary widely and unpredictably.

These are all problems that have made the engineering of environmentally friendly systems more difficult. Adding to these difficulties are user engineering/ergonomic problems. The present day PID controller can be difficult to adapt to distributed refrigeration systems. Experienced controls engineers know that a well-tuned PID controller can involve a degree of artistry in selecting the proper control constants used in the PID algorithm. In a large refrigeration system of the conventional architecture (non-distributed) the size of the system justifies having a controls engineer visit the site (perhaps repeatedly) to fine tune the control constant parameters.

This may not be practical for distributed systems in which the components are individually of a much smaller scale and far more numerous. By way of comparison, a conventional system might employ one controller for an entire multi-case, store-wide system. A distributed system for the same store might involve a controller for each case or adjacent group of cases within the store. Distributed systems need to be designed to minimize end user involvement. It would therefore be desirable if the controller were able to auto configure. Currently control systems lack this capability.

The present invention provides a distributed refrigeration system in which the condenser is disposed on the refrigeration case and serviced by a special pulse width modulated compressor that may be also disposed within the case. If desired, the condenser and compressor can be coupled to service a group of adjacent refrigeration cases, each case having its own evaporator. The pulse width modulated compressor employs two mechanical elements, such as scroll members, that move rotationally relative to one another to develop fluid pressure for pumping the refrigerant. The compressor includes a mechanism that will selectively break the seal between the two mechanical elements, thereby altering the fluid pressure developed by the compressor while allowing the mechanical elements to maintain substantially constant relative movement with one another. The compressor can be pulse width modulated by making and breaking the fluid seal without the need to start and stop the electric motor driving the mechanical elements.

The pulse width modulated compressor is driven by a control system that supplies a variable duty cycle control signal based on measured system load. The controller may also regulate the frequency (or cycle time) of the control signal to minimize pressure fluctuations in the refrigerant system. The on time is thus equal to the duty cycle multiplied by the cycle time, where the cycle time is the inverse of the frequency.

The refrigeration system of the invention has a number of advantages. Because the instantaneous capacity of the system is easily regulated by variable duty cycle control, an oversized compressor can be used to achieve faster temperature pull down at startup and after defrost, without causing short cycling as conventional compressor systems would. Another benefit of variable duty cycle control is that the system can respond quickly to sudden changes in condenser temperature or case temperature set point. The controller adjusts capacity in response to disturbances without producing unstable oscillations and without significant overshoot. Also, the ability to match instantaneous capacity to the demand allows the system to operate at higher evaporator temperatures. (Deep drops in temperature experienced by conventional systems at overcapacity are avoided.)

Operating at higher evaporator temperatures reduces the defrost energy required because the system develops frost more slowly at higher temperatures. Also, the time between defrosts can be lengthened by a percentage proportional to the accumulated runtime as dictated by the actual variable duty cycle control signal. For example, a sixty percent duty cycle would increase a standard three-hour time between defrosts to five hours (3/0.60=5).

The pulse width modulated operation of the system yields improved oil return. The refrigerant flow pulsates between high capacity and low capacity (e.g. 100% and 0%), creating more turbulence which breaks down the oil boundary layer in the heat exchangers.

Another benefit of the variable duty cycle control system is its ability to operate with a variety of expansion devices, including the simple orifice, the thermal expansion valve (TXV) and the electronic expansion valve. A signal derived from the expansion device controller can be fed to the compressor controller of the invention. This signal allows the variable duty cycle control signal and/or its frequency to be adjusted to match the instantaneous operating conditions of the expansion device. A similar approach may be used to operate variable speed fans in air cooled condenser systems. In such case the controller of the invention may provide a signal to control fan speed based on the current operating duty cycle of the compressor.

Yet another benefit of the invention is its ability to detect when the system is low on refrigerant charge, an important environmental concern. Low refrigerant charge can indicate the presence of leaks in the system. Low charge may be detected by observing the change in error between actual temperature and set point temperature as the system duty cycle is modulated. The control system may be configured to detect when the modulation in duty cycle does not have the desired effect on temperature maintenance. This can be due to a loss of refrigerant charge, a stuck thermal expansion valve or other malfunctions.

For a more complete understanding of the invention, its objects and advantages, refer to the following specification and to the accompanying drawings.

BRIEF DESCRIPTION OF THE DRAWINGS

FIG. 4 is a cross-sectional view of the compressor of FIG. 3, shown in the unloaded state;

FIG. 6 is a block diagram of the controller;

FIG. 7 is a block diagram showing how the controller may be used to modulate an evaporator stepper regulator;

FIG. 8 is a block diagram of the signal conditioning module of the controller of FIG. 6;

FIG. 9 is a block diagram of the control module of the controller of FIG. 6;

FIG. 10 is a state diagram depicting the operating states of the controller;

FIG. 15 is a block diagram illustrating the adaptive tuning module of the invention;

FIG. 17 is a state diagram illustrating the operative states of the adaptive tuning module;

FIG. 18 is a block diagram illustrating the fuzzy logic block of the adaptive tuning loop;

FIG. 19 is a membership function diagram for the fuzzy logic block of FIG. 18;

DESCRIPTION OF THE PREFERRED EMBODIMENTS

Figure 1:
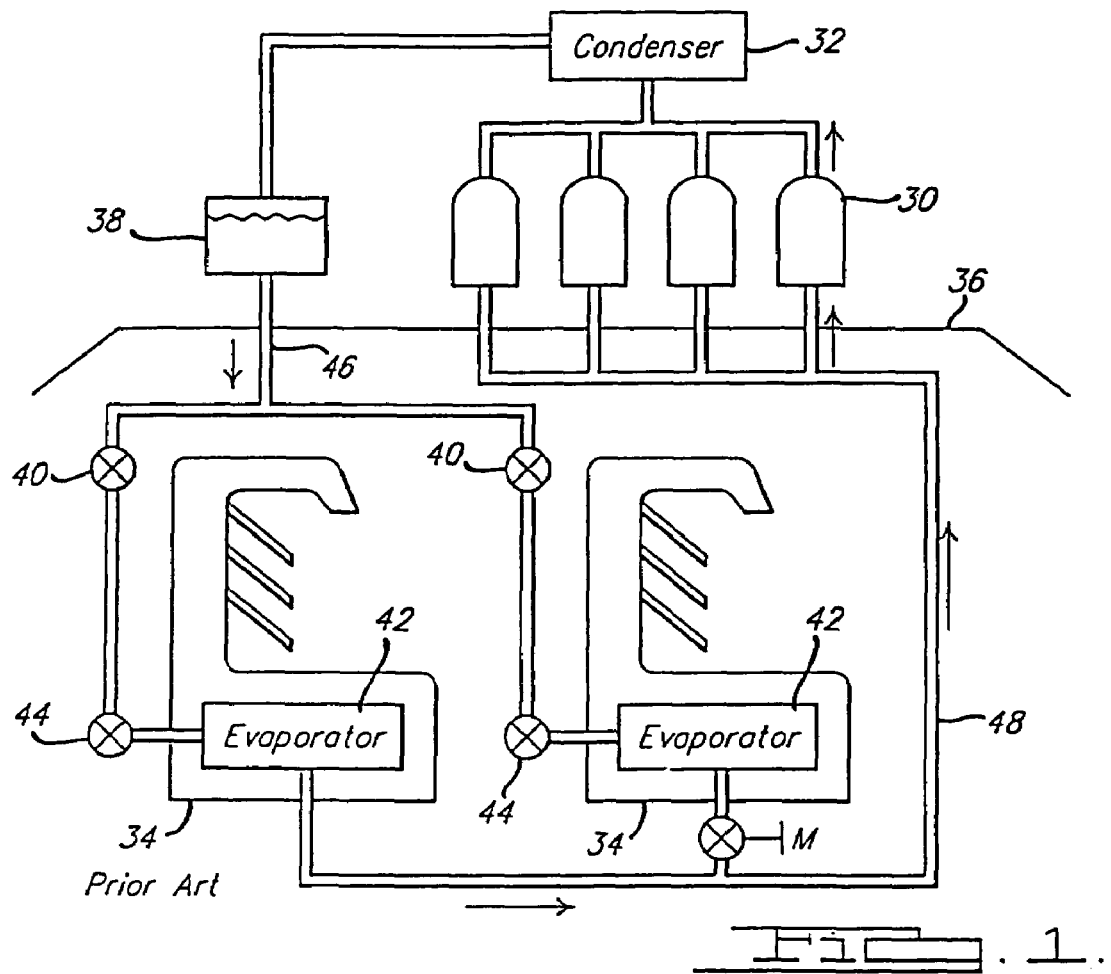
FIG. 1 is a system block diagram of a prior art refrigeration system configuration.

FIG. 1 illustrates how a conventional supermarket refrigeration system is configured. As previously discussed, it is conventional practice to place the compressors 30 and the condenser 32 in a location remote from the refrigeration cases 34. In this illustration, the compressors 30 are configured in a parallel bank located on the roof 36 of the building. The bank of compressors supply a large condenser 32, which may be air cooled or water cooled. The condenser supplies liquid refrigerant to a receiver 38. The receiver 38, in turn, supplies the individual refrigeration cases, which are connected in parallel, as illustrated. In most implementations a liquid line solenoid valve 40 is used to regulate flow to the associated evaporator 42. The refrigerant is supplied to the evaporator through a suitable expansion device such as expansion valve 44. The expansion valve 44 provides a restricted orifice that causes the liquid refrigerant to atomize into liquid droplets that are introduced into the inlet side of the evaporator 42. The evaporator 42, located within the refrigeration case 34, extracts heat from the case and its contents by vaporization of the liquid refrigerant droplets into a gas. The compressors 30 extract this gas by suction and compress it back into the liquid state. The liquid refrigerant is then cooled in the condenser 32 and returned to the receiver 38, whereupon the cycle continues.

To match cooling capacity to the load, the compressors 30 may be switched on and off individually or in groups, as required. In a typical supermarket arrangement there may be several independent systems, each configured as shown in FIG. 1, to handle different operating temperature ranges. Note that the liquid line 46 and the suction line 48 may each need to be quite lengthy (e.g., up to 150 feet) to span the distance from refrigeration case to roof.

Figure 2:
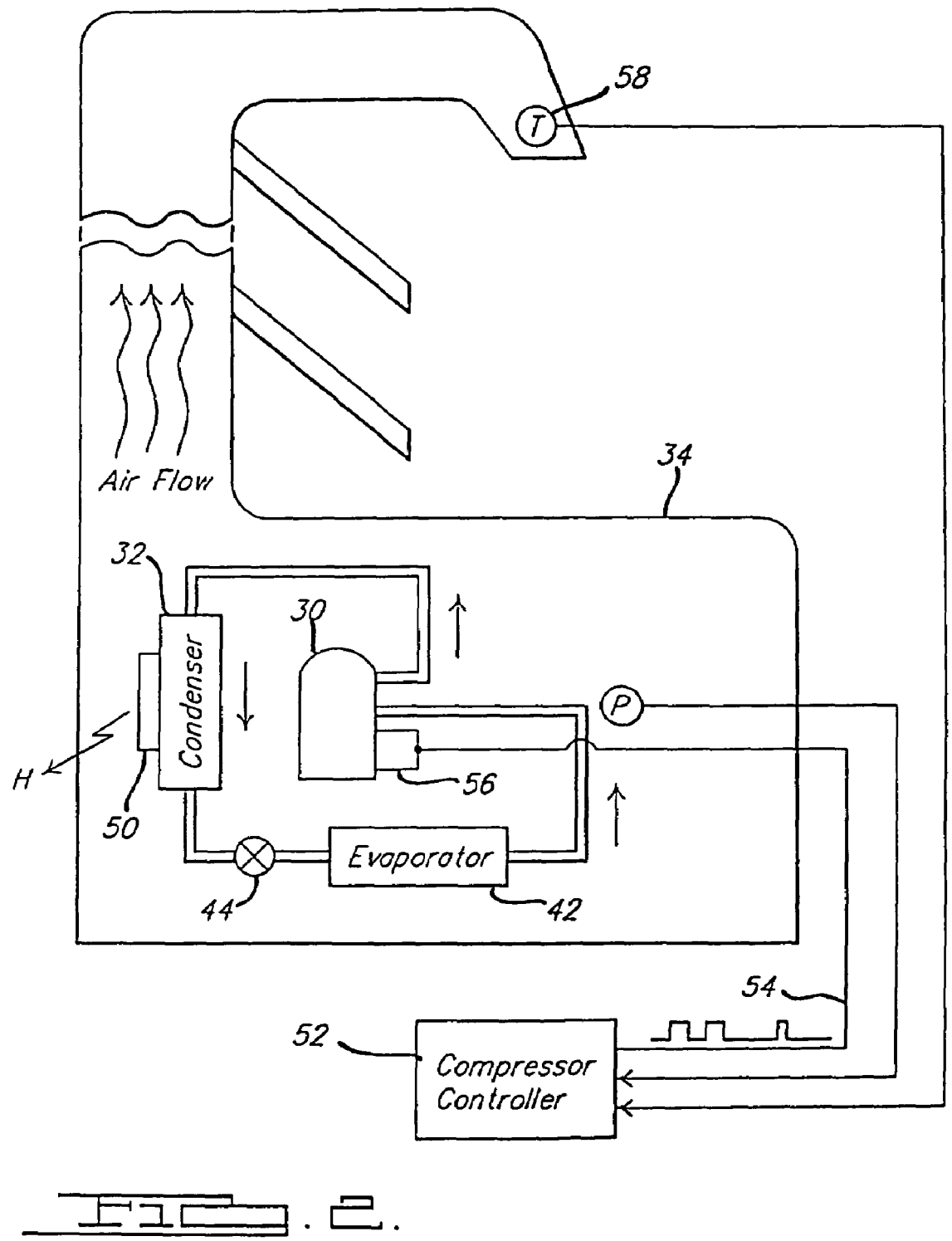
FIG. 2 is a block diagram of a refrigeration system in accordance with the present invention.

FIG. 2 shows a refrigeration case 34 configured according to the principles of the present invention. The condenser 32 and compressor 30 are both disposed within case 34 or attached thereto. Evaporator 42 and the associated expansion valve 44 are likewise disposed within case 34. The condenser 32 is provided with a heat removal mechanism 50 by which heat is transferred to ambient. The heat removal mechanism can be a water jacket connected to suitable plumbing for carrying waste heat to a water cooling tower located on the building roof. Alternatively, the heat removal mechanism can be a forced-air cooling system or a passive convection-air cooling system.

The refrigeration system of the invention employs a compressor controller 52 that supplies a pulse width modulated control signal on line 54 to a solenoid valve 56 on compressor 30. The compressor controller adjusts the pulse width of the control signal using an algorithm described below. A suitable load sensor such as temperature sensor 58 supplies the input signal used by the controller to determine pulse width.

Figure 3:
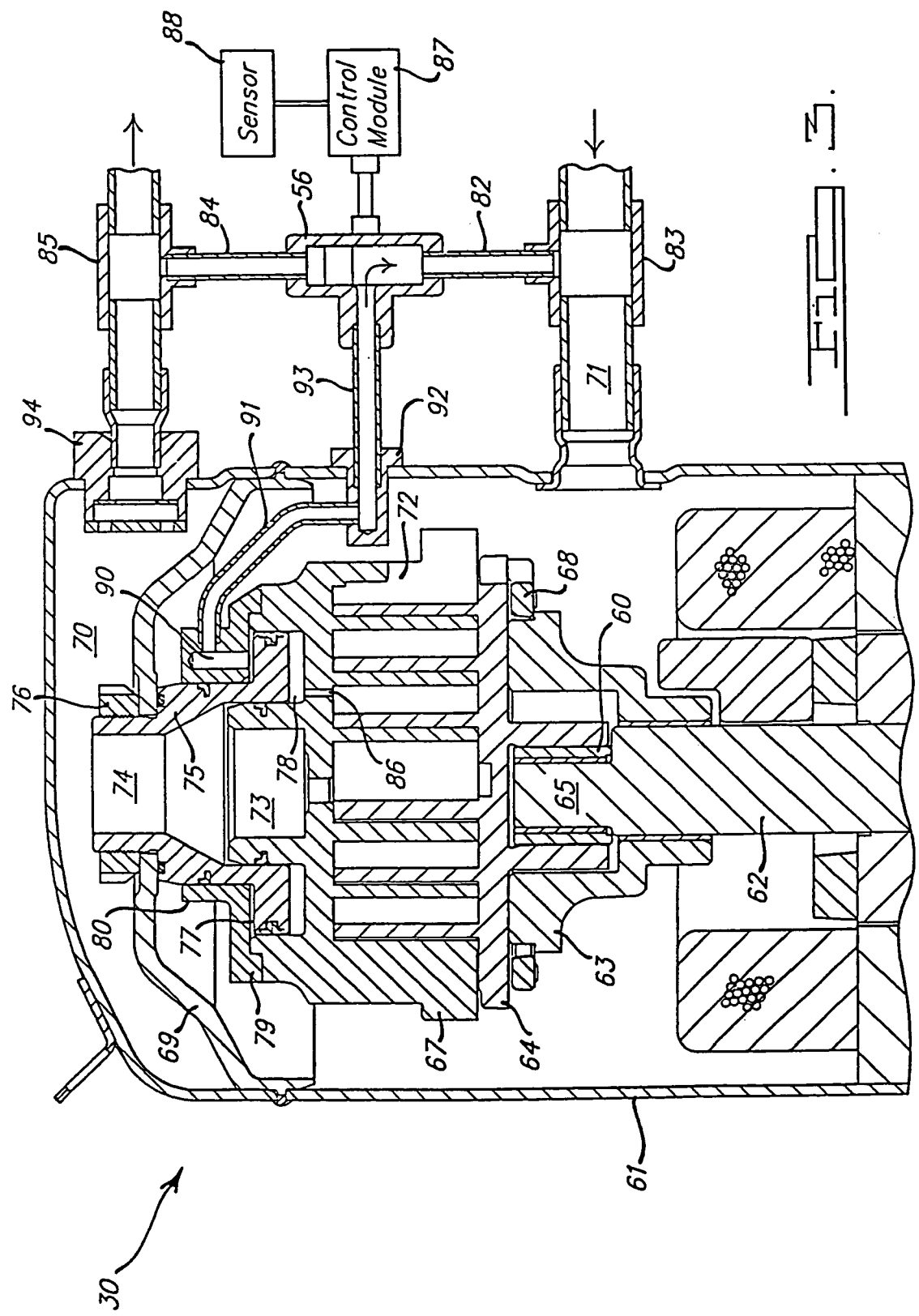
FIG. 3 is a cross-sectional view of an embodiment of the pulse width modulated compressor, shown in the loaded state.

FIGS. 3 and 4 show the details of compressor 30. FIG. 3 shows the compressor in its loaded state and FIG. 4 shows the compressor in its unloaded state. The solenoid valve 56 switches the compressor between these two states while the compressor motor remains energized. One important advantage of this configuration is that the compressor can be pulse width modulated very rapidly between the loaded and unloaded states without interrupting power to the compressor motor. This pulse width modulated cycling exerts less wear on the compressor, because the motor is not subjected to sudden changes in angular momentum.

Referring to FIGS. 3 and 4, there is shown an exemplary compressor 30. Compressor 30 may be used within a hermetic scroll compressor such as generally of the type described in assignee's U.S. Pat. No. 5,102,316.

The exemplary compressor 30 includes an outer shell 61 and an orbiting scroll member 64 supported on upper bearing housing 63 and drivingly connected to crankshaft 62 via crank pin 65 and drive bushing 60. A second non-orbiting scroll member 67 is positioned in meshing engagement with scroll member 64 and axially movably secured to upper bearing housing 63. A partition plate 69 is provided adjacent the upper end of shell 61 and serves to define a discharge chamber 70 at the upper end thereof.

In operation, as orbiting scroll member 64 orbits with respect to scroll member 67, suction gas is drawn into shell 61 via suction inlet 71 and thence into compressor 30 through inlet 72 provided in non-orbiting scroll member 67. The intermeshing wraps provided on scroll members 64 and 67 define moving fluid pockets which progressively decrease in size and move radially inwardly as a result of the orbiting motion of scroll member 64 thus compressing the suction gas entering via inlet 72. The compressed gas is then discharged into discharge chamber 70 via discharge port 73 provided in scroll member 67 and passage 74.

In order to unload compressor 30, solenoid valve 56 will be actuated in response to a signal from control module 87 to interrupt fluid communication to increase the pressure within chamber 77 to that of the discharge gas. The biasing force resulting from this discharge pressure will overcome the sealing biasing force thereby causing scroll member 67 to move axially upwardly away from orbiting scroll member 64. This axial movement will result in the creation of a leakage path between the respective wrap tips and end plates of scroll members 64 and 67 thereby substantially eliminating continued compression of the suction gas.

A flexible fluid line 91 extends from the outer end of passage 90 to a fitting 92 extending through shell 61 with a second line 93 connecting fitting 92 to solenoid valve 56. Solenoid valve 56 has fluid lines 82 and 84 connected to suction line 83 and discharge line 85 and is controlled by control module 87 in response to conditions sensed by sensor 88 to effect movement of non-orbiting scroll member 67 between the positions shown in FIGS. 3 and 4.

When compression of the suction gas is to be resumed, solenoid valve 56 will be actuated so as to move scroll member 67 into sealing engagement with scroll member 64.

Figure 5:
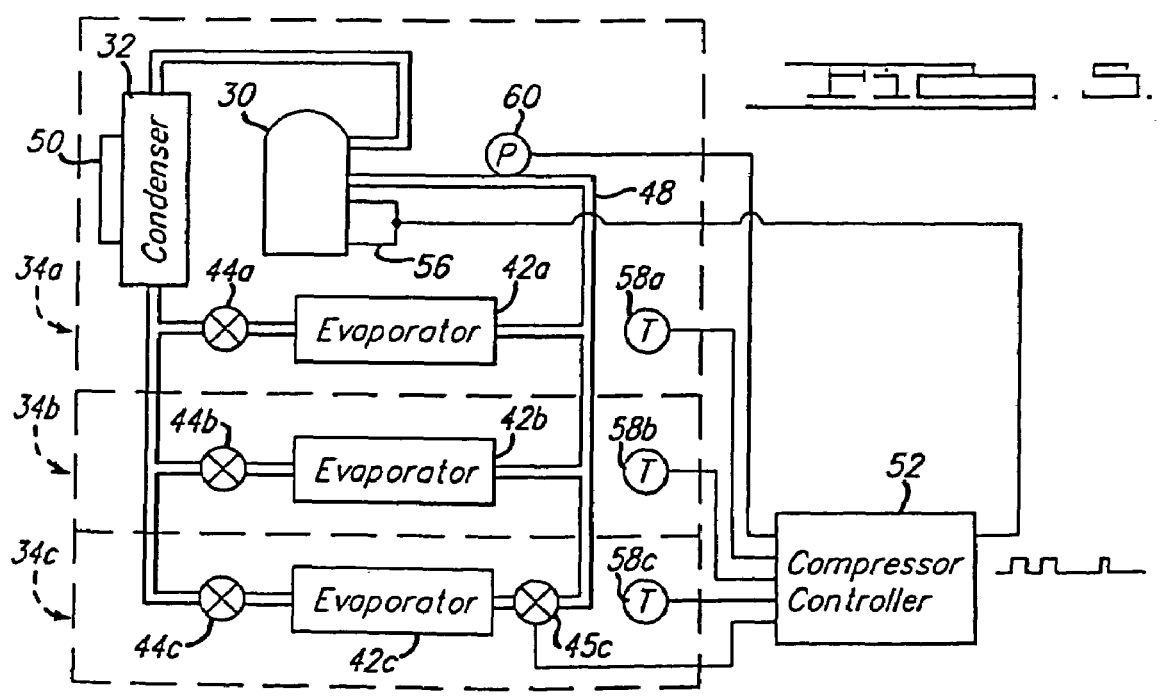
FIG. 5 is another embodiment of a refrigeration or cooling system in accordance with the present invention.

The refrigeration case embodiment of FIG. 2 may be packaged as a self-contained unit. While that may be a desirable configuration for many applications, the invention is not restricted to stand alone, self-contained refrigeration case configurations. Rather, the invention lends itself to a variety of different distributed refrigeration systems. FIG. 5 shows an example of such a distributed system.

Referring to FIG. 5, a single compressor 30 and condenser 32 can service several distributed refrigeration cases or several distributed cooling units in a heating and cooling (HVAC)

system. In FIG. 5 the refrigeration cases or cooling system housings are shown as dashed boxes, designated 34a, 34b, and 34c. Conveniently, the compressor 30 and condenser 32 may be disposed within or attached to one of the refrigeration cases or housings, such as refrigeration case or housing 34a.

Each refrigeration case or housing has its own evaporator and associated expansion valve as illustrated at 42 (a, b, c) and 44 (a, b, c). In addition, each refrigeration case or housing may have its own temperature sensor 58 (a, b, c) supplying input information to the compressor controller 52. Finally, a pressure sensor 60 monitors the pressure of the suction line 48 and supplies this information to compressor controller 52. The compressor controller supplies a variable duty cycle signal to the solenoid valve 56 as previously described.

The multiple case or multiple cooling unit embodiment of FIG. 5 shows how a single compressor can be pulse width modulated by compressor controller 52 to supply the instantaneous demand for cooling. The temperature sensors 58 (a, b, c) collectively provide an indication of the load on the system, as does pressure sensor 60. The controller adjusts the pulse width of the control signal to modulate the compressor between its high capacity and low capacity states (100%, 0%) to meet the instantaneous demand for refrigerant.

As an alternate control technique, one or more of the suction lines exiting the evaporator can be equipped with an electrically controlled valve, such as an evaporator pressure regulator valve 45c. Valve 45c is coupled to controller 52, as illustrated. It may be supplied with a suitable control signal, depending on the type of the valve. A stepper motor valve may be used for this purpose, in which case controller 30 would supply a suitable signal to increment or decrement the setting of the stepper motor to thereby adjust the orifice size of the valve. Alternatively, a pulse width modulated valve could be used, in which case it may be controlled with the same variable duty cycle signal as supplied to the compressor 30.

Controller 52 is not limited to solely compressor control applications. The variable duty cycle control signal can also be used to control other types of refrigerant flow and pressure control devices, such as refrigerant regulating valves. FIG. 7 shows such an application, where the output of controller 52 supplies control signals to evaporator stepper regulator 43. This device is a fluid pressure regulator that is adjusted by stepper motor 45. The evaporator stepper regulator (ESR) valve 43 adjusts the suction pressure to thereby adjust the capacity of the system.

A block diagram of the presently preferred compressor controller is illustrated in FIG. 6. A description of the various signals and data values shown in this and successive figures is summarized in Table I below.

TABLE I

| No. | Variable Name | Default Value | Description |
|---|---|---|---|
| 1 | Signal Conditioning: | | |
| | Sensor Alarm | False | Indicates Sensor Reading is not within expected range |
| | Sensor Mode | Min | User configuration to indicate if Min/Max/Avg is performed for all temperature Sensors |
| | Sampling Time (Ts) | 0.5 sec | Rate at which Signal conditioning block is executed |
| | Control Type | T/P Type | if controlled by only Temp. or both Temp. & Pressure |

TABLE I-continued

| No. | Variable Name | Default Value | Description |
|---|---|---|---|
| 2 | Control Block: | | |
| | Sensor Alarm | False | Same as before |
| | System Alarm | False | Generated by Adaptive Block indicative some system problem |
| | SSL | 0 | Steady state loading % |
| | Defrost Status | False | Whether system is in defrost |
| | Pull_Down_Time | 0 | Time taken to pull down after defrost |
| | Gain (K) | 7 | Gain used in PI algorithm |
| | Integral Time (Ti) | 100 | used in PI |
| | Control Time (Tc) | 10 Sec | used in PI |
| | Control Set Pt. (St) | 0 F. | used in PI |
| | Operating State | 1 | What state the machine is operating at |
| 3 | Defrost Control | | |
| | Defrost Status | False | If defrost status of the case |
| | Defrost Type | External | If the defrost is from external timer or Internal clock of controller |
| | Defrost Interval | 8 hrs | Time between defrost |
| | Defrost Duration | 1 hr | Defrost Duration |
| | Defrost Termination Temp. | 50 F. | Termination temperature for defrost |

At the heart of the controller is control block module 102. This module is responsible for supplying the variable duty cycle control signal on lead 104. Module 102 also supplies the compressor ON/OFF signal on lead 106 and an operating state command signal on lead 108. The compressor ON/OFF signal drives the contactors that supply operating current to the compressor motor. The operating state signal indicates what state the state machine (FIG. 10) is in currently.

The control block module receives inputs from several sources, including temperature and pressure readings from the temperature and pressure sensors previously described. These temperature readings are passed through signal conditioning module 110, the details of which are shown in the pseudocode Appendix. The control block module also receives a defrost status signal from defrost control module 112. Defrost control module 112 contains logic to determine when defrost is performed. The present embodiment allows defrost to be controlled either by an external logic signal (supplied through lead 114) or by an internal logic signal generated by the defrost control module itself. The choice of whether to use external or internal defrost control logic is user selectable through user input 116. The internal defrost control uses user-supplied parameters supplied through user input 118.

The preferred compressor controller in one form is auto-configurable. The controller includes an optional adaptive tuning module 120 that automatically adjusts the control algorithm parameters (the proportional constant K) based on operating conditions of the system. The adaptive tuning module senses the percent loading (on lead 104) and the operating state (on lead 108) as well as the measured temperature after signal conditioning (on lead 122). Module 120 supplies the adaptive tuning parameters to control block 102, as illustrated. The current embodiment supplies proportional constant K on lead 124 and SSL parameter on lead 126, indicative of steady-state loading percent. A system alarm signal on lead 126 alerts the control block module when the system is not responding as expected to changes in the adaptively tuned parameters. The alarm thus signals when there may be a system malfunction or loss of refrigerant charge. The alarm can trigger more sophisticated diagnostic routines, if desired. The compressor controller provides a number of user interface points through which user-supplied settings are input. The defrost type (internal/external) input 116 and the internal defrost parameters on input 118 have already been discussed. A user input 128 allows the user to specify the temperature set point to the adaptive tuning module 120. The same information is supplied on user input 130 to the control block module 102. The user can also interact directly with the control block module in a number of ways. User input 132 allows the user to switch the compressor on or off during defrost mode. User input 134 allows the user to specify the initial controller parameters, including the initial proportional constant K. The proportional constant K may thereafter be modified by the adaptive tuning module 120. User input 136 allows the user to specify the pressure differential (dP) that the system uses as a set point.

In addition to these user inputs, several user inputs are provided for interacting with the signal conditioning module 110. User input 138 selects the sensor mode of operation for the signal conditioning module. This will be described in more detail below. User input 140 allows the user to specify the sampling time used by the signal conditioning module. User input 142 allows the user to specify whether the controller shall be operated using temperature sensors only (T) or temperature and pressure sensors (T/P).

Referring now to FIG. 8, the signal conditioning module is shown in detail. The inputs (temperature and/or pressure sensors) are shown diagrammatically at 144. These inputs are processed through analog to digital convertor 146 and then supplied to the control type selector 148. Temperature readings from the temperature and/or pressure sensors are taken sequentially and supplied serially through the analog to digital convertor. The control type selector codes or stores the data so that pressure and temperature values are properly interpreted.

Digital filtering is then applied to the signal at 150 to remove spurious fluctuations and noise. Next, the data are checked in module 152 to ensure that all readings are within expected sensor range limits. This may be done by converting the digital count data to the corresponding temperature or pressure values and checking these values against the pre-stored sensor range limits. If the readings are not within sensor range an alarm signal is generated for output on output 154.

Next a data manipulation operation is performed at 156 to supply the temperature and/or pressure data in the form selected by the sensor mode user input 138. The current embodiment will selectively average the data or determine the minimum or maximum of the data (Min/Max/Avg). The Min/Max/Avg mode can be used to calculate the swing in pressure differential, or a conditioned temperature value. The average mode can be used to supply a conditioned temperature value. These are shown as outputs 158 and 160, respectively.

FIG. 9 shows the control block module in greater detail. The conditioned temperature or pressure signal is fed to calculation module 162 that calculates the error between the actual temperature or pressure and the set point temperature or pressure. Module 162 also calculates the rate of change in those values.

The control block module is designed to update the operating state of the system on a periodic basis (every $T_c$ seconds, nominally once every second). The Find Operating State module 164 performs this update function. The state diagram of FIG. 10 provides the details on how this is performed. Essentially, the operating state advances, from state to state, based on whether there is a sensor alarm (SA) present, whether there is a defrost status signal (DS) present and what the calculated error value is. The Find Operating State module 164 supplies the operating state parameter and the Pull Down Time parameter to the decision logic module 166.

Referring to FIG. 10, the Find Operating State module 164 advances from state to state as follows. Beginning in the initial state 168 the module advances to the normal operating state 170 after initialization. It remains in that state until certain conditions are met. FIG. 10 shows by label arrows what conditions are required to cycle from the normal operating state 170 to the defrost state 172; to the pull down state 174; to the sensor alarm pull down state 176; to the sensor alarm operating state 178 and to the sensor alarm defrost state 180.

The decision logic module 166 (FIG. 9) determines the duty cycle of the variable duty cycle signal. This is output on lead 182, designated % Loading. The decision logic module also generates the compressor ON/OFF signal on lead 184. The actual decision logic will be described below in connection with FIG. 11. The decision logic module is a form of proportional integral (PI) control that is based on an adaptively calculated cycle time $T_{cyc}$. This cycle time is calculated by the calculation module 186 based on a calculated error value generated by module 188. Referring back to FIG. 6, the conditioned pressure differential signal on lead 122 (Cond dP) is supplied to the Calculate Error module 188 (FIG. 9) along with the pressure differential set point value as supplied through user input 136 (FIG. 6). The difference between actual and set point pressure differentials is calculated by module 188 and fed to the calculation module 186. The adaptive cycle time $T_{cyc}$ is a function of the pressure differential error and the operating state as determined by the find operating state module 164 according to the following calculation:

$$T_{cyc(new)} = T_{cyc(old)} + K_c * \text{Error} \tag{1}$$

where:

$K_c$: proportional constant; and

Error: (actual−set point) suction pressure swing.

Figure 11:
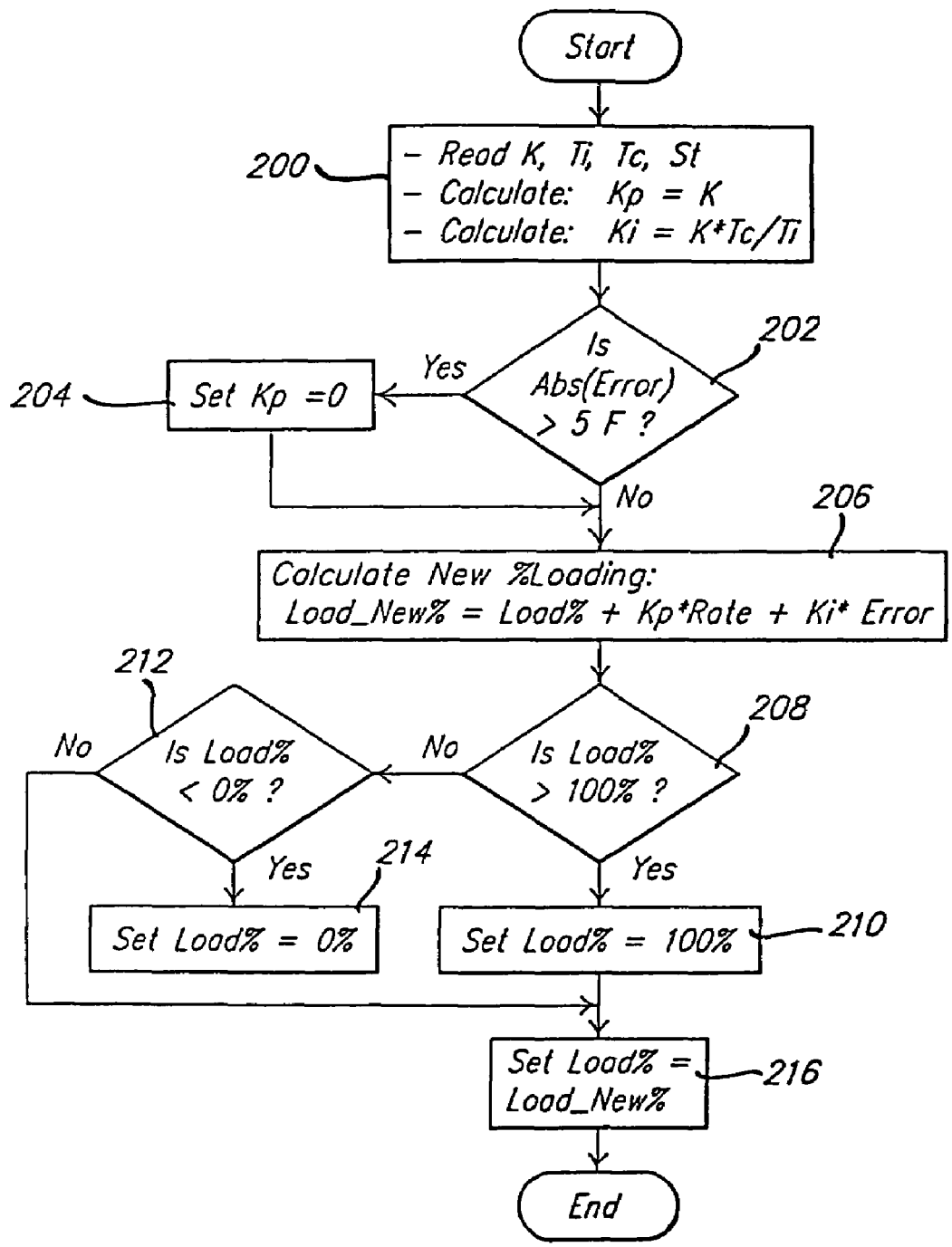
FIG. 11 is a flowchart diagram illustrating the presently preferred PI control algorithm.

The presently preferred PI control algorithm implemented by the decision logic module 166 is illustrated in FIG. 11. The routine begins at step 200 by reading the user supplied parameters K, $T_i$, $T_c$ and $S_r$. See FIG. 6 for a description of these user supplied values. The constant $K_p$ is calculated as being equal to the initially supplied value K; and the constant $K_i$ is calculated as the product of the initially supplied constant K and the ratio $T_c/T_i$.

Next, at step 202 a decision is made whether the absolute value of the error between set point temperature and conditioned temperature (on lead 190, FIG. 9) is greater than 5° F. If so, the constant $K_p$ is set equal to zero in step 204. If not, the routine simply proceeds to step 206 where a new loading percent value is calculated as described by the equation in step 206 of FIG. 11. If the load percent is greater than 100 (step 208), then the load percent is set equal to 100% at step 210. If the load percent is not greater than 100% but is less than 0% (step 212) the load percent is set equal to 0% at step 214. If the load percent is between the 0% and 100% limits, the load percent is set equal to the new load percent at step 216.

Figure 12:
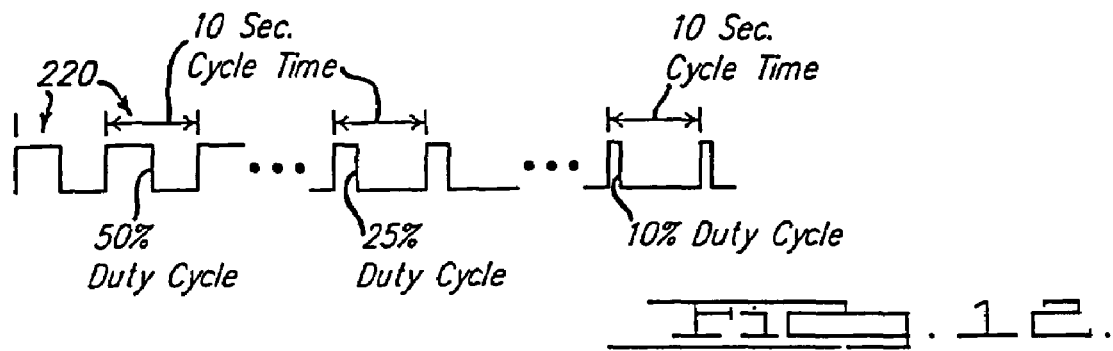
FIG. 12 is a waveform diagram illustrating the variable duty cycle signal produced by the controller and illustrating the operation at a constant frequency.
Figure 13:
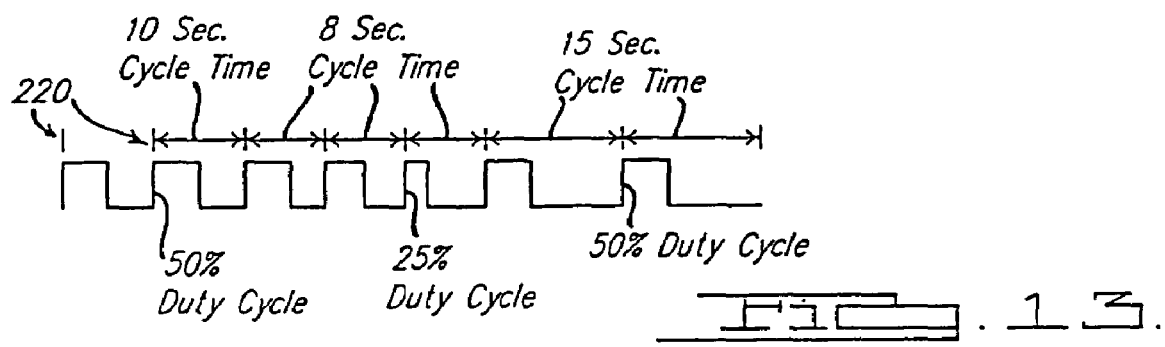
FIG. 13 is a waveform diagram of the variable duty cycle signal, illustrating variable frequency operation.

The variable duty cycle control signal generated by the controller can take several forms. FIGS. 12 and 13 give two examples. FIG. 12 shows the variable duty cycle signal in which the duty cycle varies, but the frequency remains constant. In FIG. 12, note that the cycle time, indicated by hash marks 220, are equally spaced. By comparison, FIG. 13 illustrates the variable duty cycle signal wherein the frequency is also varied. In FIG. 13, note that the hash marks 220 are not equally spaced. Rather, the waveform exhibits regions of constant frequency, regions of increasing frequency and regions of decreasing frequency. The variable frequency illustrated in FIG. 13 is the result of the adaptive modulation of the cycle time $T_{cyc}$.

Figure 14:
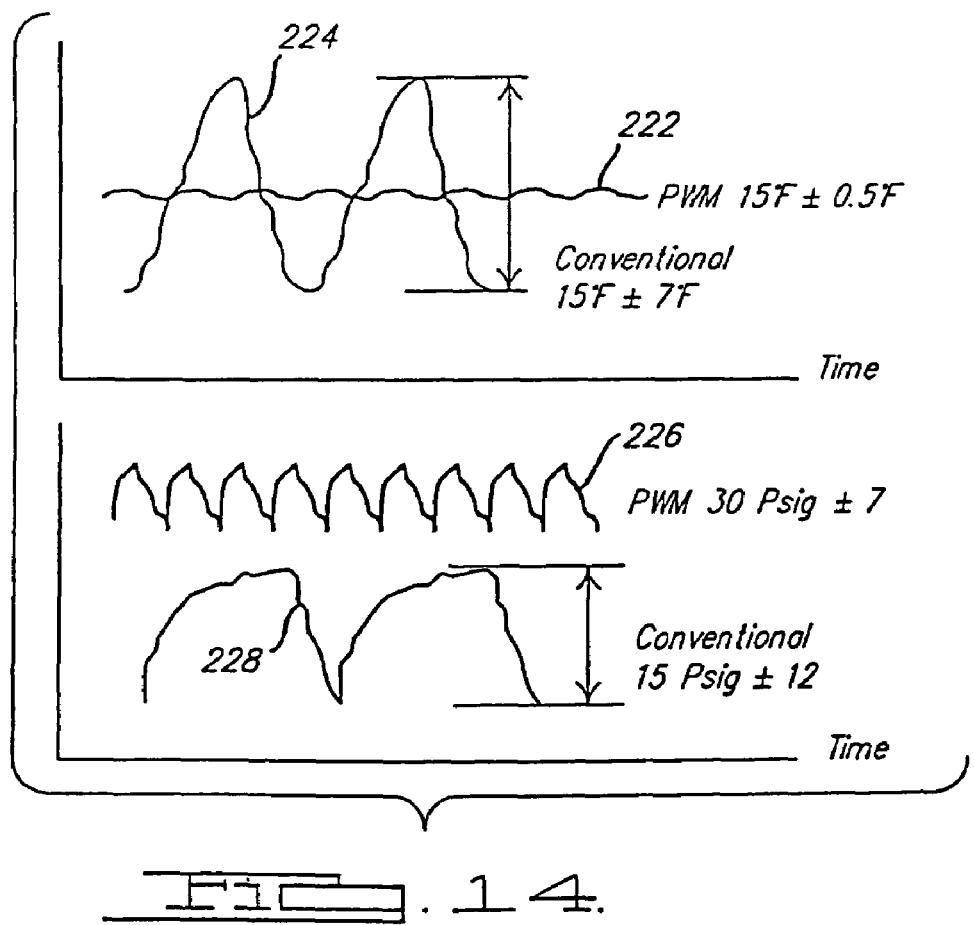
FIG. 14 is a series of graphs comparing temperature and pressure dynamics of system employing the invention with a system of conventional design.

FIG. 14 graphically shows the benefits that the control system of the invention has in maintaining tighter temperature control and higher suction pressure with improved system efficiency. Note how the temperature curve 222 of the invention exhibits considerably less fluctuation than the corresponding temperature curve 224 of a conventional controller. Similarly, note that the pressure curve 226 of the invention has a baseline well above that of pressure curve 228 of the conventional controller. Also, the peak-to-peak fluctuation in pressure exhibited by the invention (curve 226) is much smaller than that of the conventional controller (curve 228).

The controller of the invention operates at a rate that is at least four times faster (typically on the order of at least eight times faster) than the thermal time constant of the load. In the presently preferred embodiment the cycle time of the variable duty cycle signal is about eight times shorter than the time constant of the load. By way of non-limiting example, the cycle time of the variable duty cycle signal might be on the order of 10 to 15 seconds, whereas the time constant of the system being cooled might be on the order of 1 to 3 minutes. The thermal time constant of a system being cooled is generally dictated by physical or thermodynamic properties of the system. Although various models can be used to describe the physical or thermodynamic response of a heating or cooling system, the following analysis will demonstrate the principle.

Modeling the Thermal Time Constant of the System being Cooled.

One can model the temperature change across the evaporator coil of a refrigeration system or heat pump as a first order system, wherein the temperature change may be modeled according to the following equation:

$$\Delta T = \Delta T_{ss}[1-\exp(-t/\gamma)] + \Delta T_0 \exp(-\tau/\gamma).$$

where:
$\Delta T$=air temperature change across coil
$\Delta T_{ss}$=steady state air temperature change across coil
$\Delta T_0$=air temperature change across the coil at time zero
t=time
$\gamma$=time constant of coil The transient capacity of the unit can be obtained by multiplying the above equation by the air mass flow rate (m) and specific heat at constant pressure ($C_p$) and integrating with respect to time.

Generally, it is the removal of the refrigerant from the evaporator that controls the time required to reach steady state operating condition, and thus the steady state temperature change across the condenser coil. If desired, the system can be modeled using two time constants, one based on the mass of the coil and another based on the time required to get the excess refrigerant from the evaporator into the rest of the system. In addition, it may also be desirable to take into account, as a further time delay, the time lag due to the large physical distance between evaporator and condenser coils in some systems.

The thermal response of the evaporator coil may be modeled by the following equation:

$$\mathbf{9} = \tfrac{1}{2}[(1-e^{t/\gamma_1}) + (1-e^{t/\gamma_2})]$$

where:
$\mathbf{9}$=temperature change across coil/steady state temperature change across coil
t=time
$\gamma_1$=time constant based on mass of coil
$\gamma_2$=time constant based on time required to remove excess refrigerant from evaporator In practice, the controller of the invention cycles at a rate significantly faster than conventional controllers. This is because the conventional controller cycles on and off in direct response to the comparison of actual and set-point temperatures (or pressures). In other words, the conventional controller cycles on when there is demand for cooling, and cycles off when the error between actual and set-point temperature is below a predetermined limit. Thus the on-off cycle of the conventional controller is very highly dependent on the time constant of the system being cooled.

In contrast, the controller of the invention cycles on and off at a rate dictated by calculated values that are not directly tied to the instantaneous relation between actual and set-point temperatures or pressures. Rather, the cycle time is dictated by both the cycle rate and the duty cycle of the variable duty cycle signal supplied by the controller. Notably, the point at which the controller cycles from on to off in each cycle is not necessarily the point at which the demand for cooling has been met, but rather the point dictated by the duty cycle needed to meet the demand.

Adaptive Tuning

The controller Geneva described above can be configured to perform a classic control algorithm, such as a conventional proportional-integral-derivative (PID) control algorithm. In the conventional configuration the user would typically need to set the control parameters through suitable programming. The controller may also be of an adaptive type, described here, to eliminate the need for the user to determine and program the proper control parameters.

Thus, one important advantage of the adaptive controller is its ability to perform adaptive tuning. In general, tuning involves selecting the appropriate control parameters so that the closed loop system is stable over a wide range of operating conditions, responds quickly to reduce the effect of disturbance on the control loop and does not cause excessive wear of mechanical components through continuous cycling. These are often mutually exclusive criteria, and a compromise must generally be made. In FIG. 18 (and also FIG. 6) there are two basic control loops: the refrigeration control loop and the adaptive tuning loop. The refrigeration control loop is administered by control block module 102; the adaptive loop is administered by adaptive tuning module 120. Details of the adaptive tuning module 120 are shown in FIGS. 15, 16a-16c and 17. The presently preferred adaptive tuning module uses a fuzzy logic control algorithm that will be described in connection with FIGS. 18-20.

Referring to FIG. 15, the adaptive tuning module performs basically three functions. First, it decides whether to perform adaptive tuning. This is handled by module 240. Second, it gathers the needed parameters for performing adaptive tuning. This is handled by module 242. Third, it calculates the adaptive gain used by the control loop. This is handled by module 244.

Figure 16A:
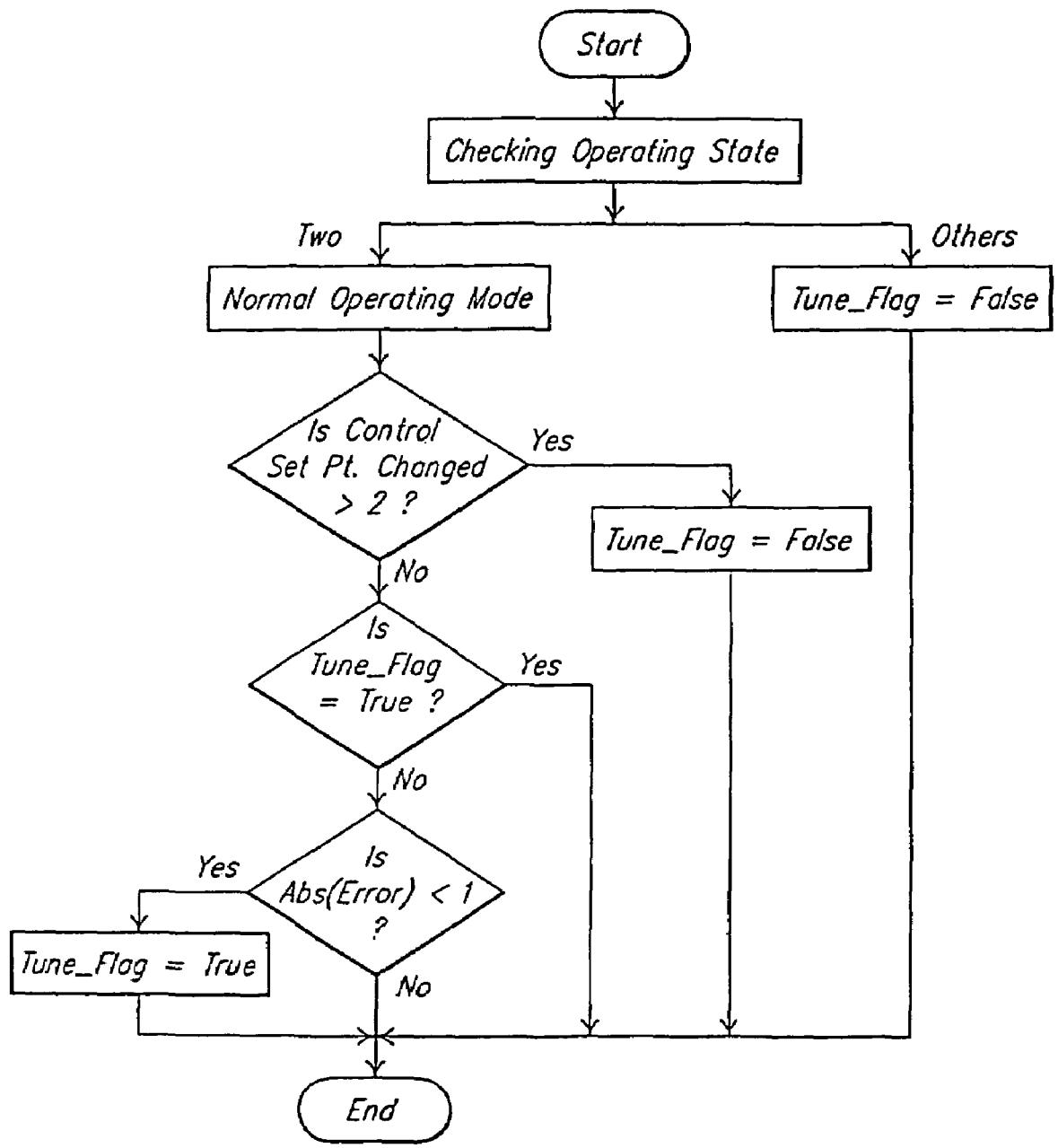
FIG. 16a is a flowchart diagram illustrating the presently preferred operation of the adaptive tuning module, specifically with respect to the decision whether to start tuning.
Figure 16B:
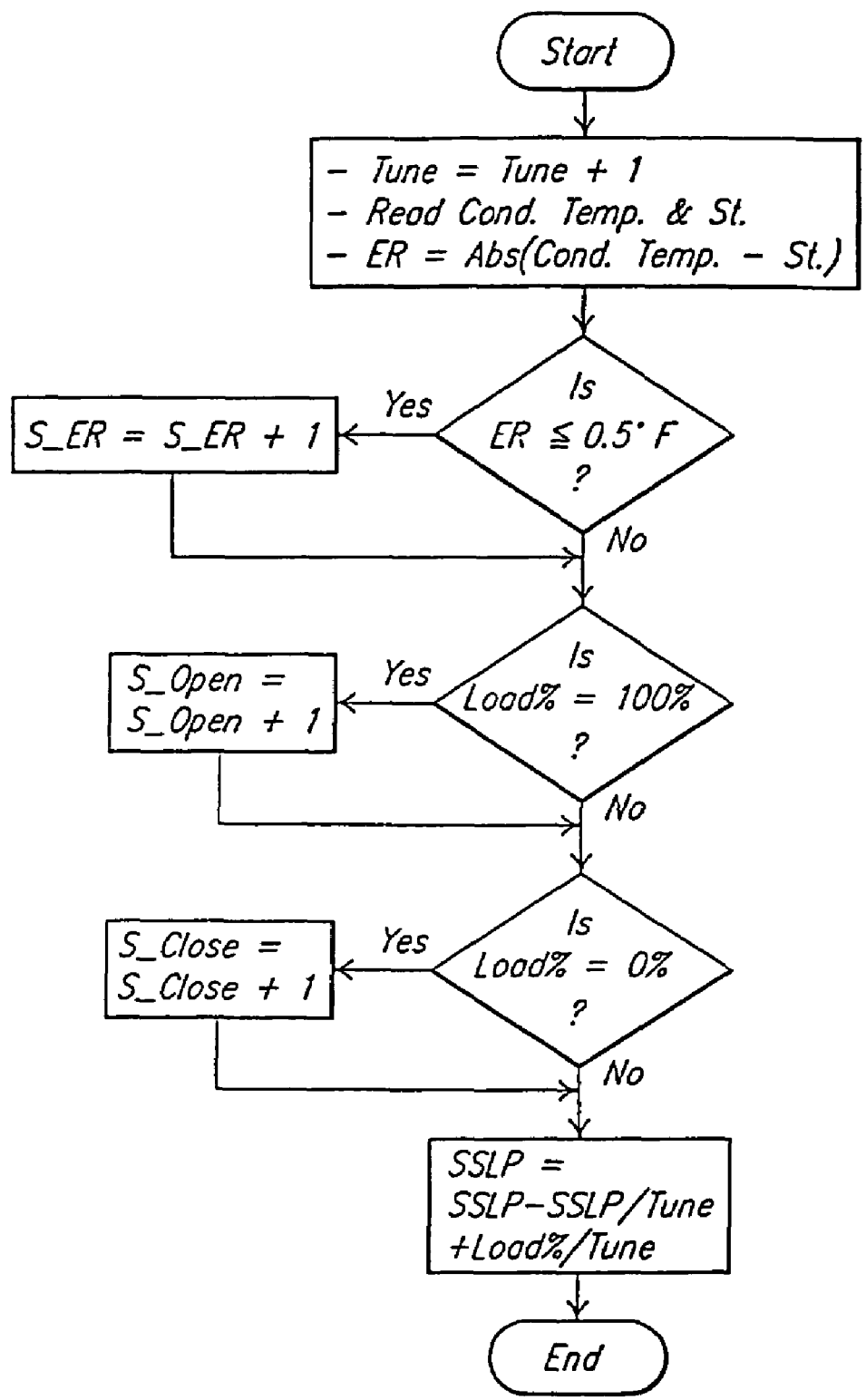
FIG. 16b is a flowchart diagram illustrating the presently preferred process performed by the adaptive tuning module in the integration mode.

Module 240 bases the decision on whether to start tuning upon two factors: the current operating state of the system and the control set point. The flowchart of FIG. 16a shows the steps involved in this decision. Module 242 integrates key parameters needed for the calculations performed by module 244. Essentially, module 242 inputs the percent loading, the temperature and pressure values and the set point temperature. It outputs the following data: S_ER (the total number of conditioned temperature and pressure data points that are within 0.5 degrees or 1 Psig of the set point value), S_Close (the total number of percent loading data points that goes to zero percent during a given sampling interval, e.g. 30 min.), S_Open (the total number of percent loading data points that goes to 100% in the sampling interval) and SSLP (a moving average or rolling average of the percent loading during the sampling interval). Module 242 is responsive to a tuning flag that is set by module 240. Module 242 performs the integration of these key parameters when signaled to do so by the tuning flag. FIG. 16b shows the steps involved in performing integration of these key parameters.

Figure 16C:
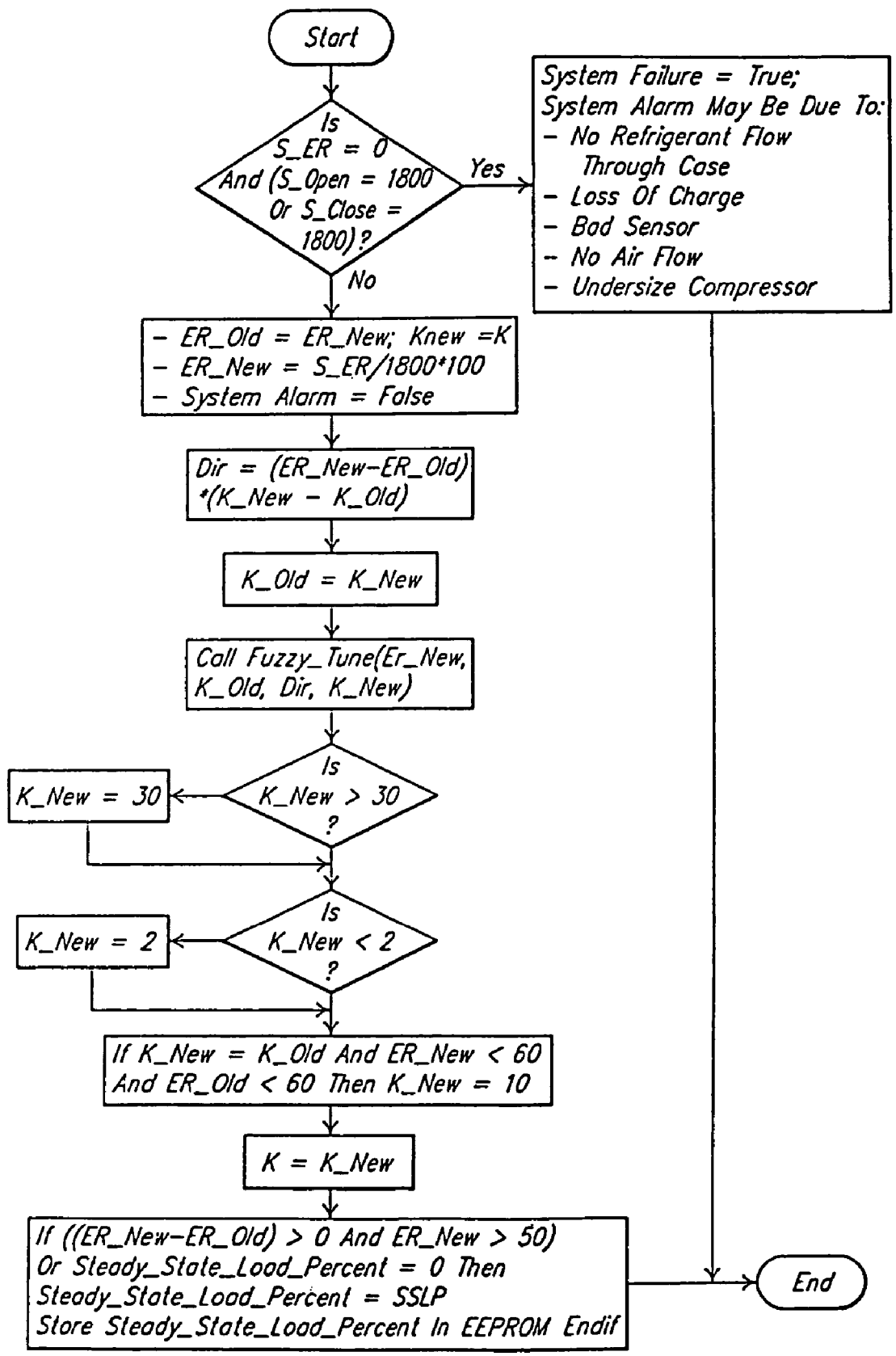
FIG. 16c is a flowchart diagram illustrating the operation of the adaptive tuning module in the calculation mode.

Finally, the calculation block takes the data supplied by module 242 and calculates the adaptive gain using the process illustrated in FIG. 16c.

The adaptive tuning module 120 will cycle through various operating states, depending on the state of a timer. FIG. 17 is a state diagram showing how the presently preferred embodiment will function. Note that the sequence transitions from the initialization mode to either the integration mode or the no tuning mode, depending on whether the tuning flag has been set. Once in the integration mode, the system performs integration until the timer lapses (nominally 30 minutes), whereupon the calculation mode is entered. Once the calculations are completed the timer is reset and the system returns to the initialization mode.

The block diagram of the adaptive scheme is shown in FIG. 18. There are two basic loops—The first one is the PID control loop 260 that runs every "dt" second and the second is the adaptive loop 262 that runs every "ta" second. When the control system starts, the PID control loop 260 uses a default value of gain (K) to calculate the control output. The adaptive loop 262, checks the error e(t) 264 every "ta" seconds 266 (preferably less than 0.2*dt seconds). At module 268 if the absolute value of error, e(t), is less than desired offset (OS), a counter Er_new is incremented. The Offset (OS) is the acceptable steady-state error (e.g. for temperature control it may be +/1° F.). This checking process continues for "tsum" seconds 270 (preferably 200 to 500 times dt seconds). After "tsum" seconds 270, the value Er_new is converted into percentage (Er-new % 272). The parameter Er_new % 272 indicates the percentage of sampled e(t) that was within accepted offset (OS) for "tsum" time. In other words, it is a measure of how well the control variable was controlled for past "tsum" seconds. A value of 100% means "tight" control and 0% means "poor" control. Whenever Er_new % is 100%, the gain remains substantially unchanged as it indicates tighter control. However, if Er_new happens to be between 0 and 100%, adaptive fuzzy-logic algorithm module 274 calculates a new gain (K_new 276) that is used for next "tsum" seconds by the control algorithm module 278.

In the preferred embodiment, there is one output and two inputs to the fuzzy-logic algorithm module 274. The output is the new gain (K_new) calculated using the input, Er_new %, and a variable, Dir, defined as follows:

$$Dir = \text{Sign}[(ER\_\text{new }\% - ER\_\text{old }\%)*(K\_\text{new} - K\text{-old})] \quad (2)$$

where:
Sign stands for the sign (+ve, −ve or zero) of the term inside the bracket;
Er_new % is the percentage of e(t) that is within the offset for past "tsum" seconds;
Er_old % is the value of Er_new % in "(tsum−1)" iteration;
K_new is the gain used in "tsum" time; and
K_old is the gain in (tsum−1) time.

For example, suppose the controller starts at 0 seconds with a default value of K=10 and, ta=1 seconds, tsum=1000 seconds and OS=1. Suppose 600 e(t) data out of a possible 1000 data was within the offset. Therefore, after 1000 sec, Er_new %=60 (i.e., 600/1000*100), K_new=10. Er_old % and K_old is set to zero when the adaptive fuzzy-logic algorithm module 274 is used the first time. Plugging these numbers in Eq. (2) gives the sign of the variable "Dir" as positive. Accordingly, the inputs to the adaptive fuzzy-logic module 274 for the first iteration are respectively, Er_new %=60 and Dir=+ve.

The next step is to perform fuzzification of these inputs into fuzzy inputs by using membership functions.

Fuzzification:

A membership function is a mapping between the universe of discourse (x-axis) and the grade space (y-axis). The universe of discourse is the range of possible values for the inputs or outputs. For ER_new % it is preferably from 0 to 100. The value in the grade space typically ranges from 0 to 1 and is called a fuzzy input, truth value, or a degree of membership. FIG. 19 shows graph 300 which contains the membership functions for the input, Er_new %. Er_new % is divided into three linguistic variables—LARGE (304), MEDIUM (306) AND SMALL (308). For Er_new %=60, the fuzzy inputs (or degree of membership function) are—0.25 of LARGE and 0.75 of MEDIUM. The input variable "Dir" is well defined (+ve, −ve or zero) and thus does not require a membership function in this application. The next step is to create the "Truth Table" or Rule Evaluation.

Figure 20:
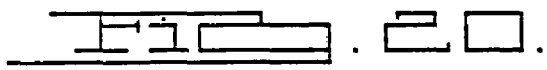
FIG. 20 is a truth table relating to the membership function of FIG. 19 as used by the fuzzy logic block of FIG. 18.

Rule Evaluation:

Rule evaluation takes the fuzzy inputs from the fuzzification step and the rules from the knowledge base and calculates fuzzy outputs. FIG. 20 shows the rules as truth table. For the first column and first row, the rule is:

"IF ER_new % is LARGE AND Dir is NEGATIVE THEN New Gain is NO CHANGE (NC)" (i.e. if the percentage of e(t) data that is within the offset (OS) for last "tsum" seconds is LARGE and the direction (DIR) is NEGATIVE/ZERO then do not change the existing K value (NO CHANGE)).

In the example, because ER_new % has fuzzy inputs LARGE (0.25) AND MEDIUM (0.75) with POSITIVE Dir, the rules that will be used are:
  IF ER_new % is LARGE (0.25) AND Dir is POSITIVE THEN New Gain is NO CHANGE (NC=1)
  IF ER_new % is MEDIUM (0.75) AND Dir is POSITIVE THEN New Gain is POSITIVE SMALL CHANGE (PSC=1.2)

Figure 21:
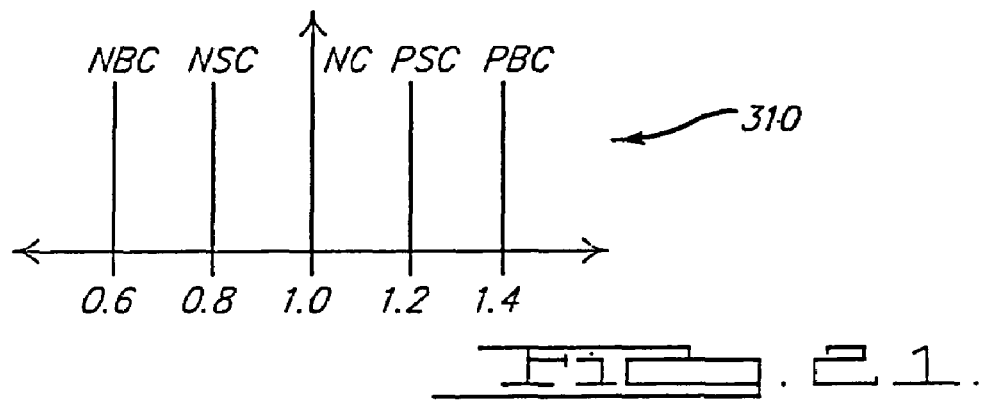
FIG. 21 is an output membership function diagram for the fuzzy logic block of FIG. 18.

Defuzzification:

Finally, the defuzzification process converts the fuzzy outputs from the rule evaluation step into the final output by using Graph 310 of FIG. 21. Graph 310, uses the following labels="NBC" for negative big change; "NSC" for negative small change; "NC" for no change; "PSC" for positive small change; and PBC for positive big change. The Center of Gravity or centroid method is used in the preferred embodiment for defuzzification. The output membership function for change in gain is shown in FIG. 21.

The centroid (the Fuzzy-Logic Output) is calculated as:

$$\text{Centroid} = K\_\text{new} \cdot \left[ \frac{\sum_{all.x} \mu(x) \cdot x}{\sum_{all.x} \mu(x)} \right]$$

where:

(x) is the fuzzy output value for universe of discourse value x.

In our example, the output (K_new) becomes $$\text{Output} = 10 \cdot \left[ \frac{0.25(1) + 0.75(1.2)}{0.25 + 0.75} \right] \approx 11.50$$

Once the three steps of fuzzification, rule evaluation, and defuzzification are finished and the output has been calculated, the process is repeated again for new set of Er_new %.

In the above example, after the first 1000 sec, the adaptive algorithm calculates a new gain of K_new=11.50. This new gain is used for the next 1000 sec (i.e. from t=1000 to 2000 sec in real time) by the PID control loop. At t=1001 sec, counter Er_new is set to zero to perform counting for the next 1000 seconds. At the end of another 1000 seconds (ie. at t=2000 seconds), Er_new % is calculated again.

Suppose this time, Er_new % happens to be 25. This means, by changing K from 10 to 11.5, the control became worse. Therefore, it would be better to change gain in the other direction, i.e., decrease the gain rather than increase. Thus, at t=2000 sec, Er_new %=25, Er_old %=60 (previous value of Er-new %), K_new=11.5 and K_old=10 (previous value of K). Applying Eq. (2), a negative "Dir" is obtained. With Er_new % of 25 and Dir=Negative, the fuzzy-logic calculation is performed again to calculate a new gain for the next 1000 seconds. The new value of gain is K_new=7.76 and is used from t=2000 to 3000 seconds by the PID Loop.

Suppose for the third iteration, i.e., from t=2000 to 3000 seconds, Er_new % comes out to be 95% (which represents tighter control). Performing the same fuzzy-logic operation gives the same value of K_new, and the gain remains unchanged until Er_new % again degrades.

Exemplary Applications:

Both pulse width modulated (PWM) Compressors and electronic stepper regulator (ESR) Valves can be used to control evaporator temperature/pressure or evaporator cooling fluid (air or water) temperature. The former controls by modulating the refrigerant flow and the latter restricts the suction side to control the flow. Referring back to FIG. 18, the block diagram of the control system for such an actuator working in a refrigeration system 279 is shown. In FIG. 18 one and preferably up to four temperatures of evaporator cooling fluid or one evaporator suction pressure (generally shown at 282) is sampled every dt seconds. A sampling time of dt=10 seconds was found to be optimum for both the applications. After processing by the analog to digital module 284, the sampled signal is then reduced to one number by taking the average or the minimum or the maximum of the four temperatures depending on the system configuration or the user preference at module 286. Typically, in a single actuator (PWM/ESR) systems where the complete evaporator coil goes into defrost at one time, averaging of control signal is preferred. In a multiple evaporator-single actuator system where defrost of evaporator coils does not occur at the same time, minimum is the preferred mode. The value obtained after avg/min/max is called conditioned signal. At comparison module 288 this is compared with the desired set point to calculate the error, e(t).

The control algorithm used in the loop is a Proportion-integral (PI) control technique (PID). The PI algorithm calculates the valve position (0-100%) in case of ESR or calculates the percentage loading (0 to 100%) in case of PWM compressor. A typical integral reset time, Ti, for both the actuators is 60 seconds. The gain is tuned adaptively by the adaptive loop. The adaptive algorithm is turned off in the preferred embodiment whenever: the system is in defrost; is going through pull-down; there is a big set point change; sensor failure has been detected; or any other system failure is detected.

Consequently, the adaptive algorithm is typically used when the system is working under normal mode. The time "ta" preferably used is about 1 seconds and "tsum" is about 1800 seconds (30 minutes).

Figure 22:
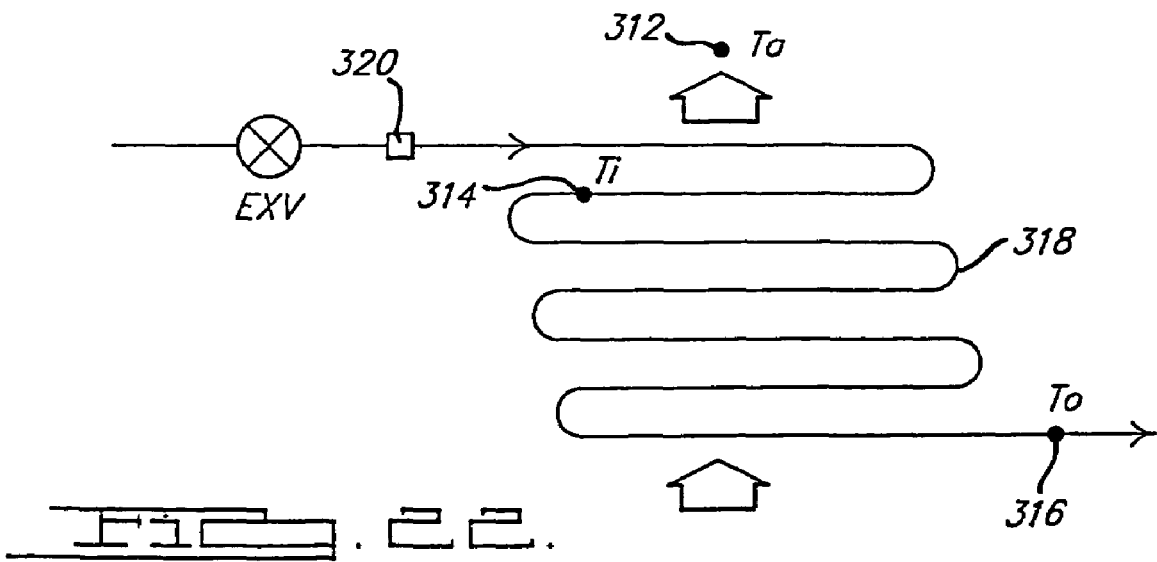
FIG. 22 is a schematic illustrating exemplary sensor locations for control-related and diagnostic-related functions of the present invention.

Diagnostics Related to PWM Compressor/ESR Valves:

Referring to FIG. 22, a discharge cooling fluid temperature sensor 312 (Ta), an evaporator coil inlet temperature sensor 314 (Ti) and an evaporator coil exit temperature sensor 316 (To) can provide diagnostic features for the evaporator control using PWM/ESR. The inlet temperature sensor 314 can be anywhere in evaporator coil 318. However, the preferred location is about one third of the total evaporator length from the evaporator coil distributor 320.

Using these three temperature sensors, system learning can be performed that can be used for diagnostics. For example, diagnostics can be performed for ESR/PWM when it is used in a single evaporator along with an expansion valve. In this example, the following variables are tracked every "tsum" second in the adaptive loop. The variables can be integrated just after ER_new integration is done in the adaptive loop.

N-Close: Number of times Valve position/PWM loading was 0%.

N-Open: Number of times Valve position/PWM loading was 100%.

MAVP: The moving average of the Valve position/PWM loading for "tsum" seconds.

SSLP: The steady-state Valve position/PWM loading is set equal to MAVP if for the "tsum"

duration ER_new % is greater than 50%.

dT: Moving average of the difference between Ta and Ti (Ta−Ti).

SH: Moving average of the difference between To and Ti (To−Ti) in the said duration. This is approximately the evaporator superheat.

N_FL: Number of times To was less than Ti during the said duration, i.e., "tsum" seconds. This number will indicate how much the expansion valve is flooding the evaporator.

In addition, Pull-down time after defrost, tpd, is also learnt. Based on these variables, the following diagnostics are performed: temperature sensor failure; degraded expansion valve; degraded ESR valve/PWM Compressor; oversized ESR/PWM; undersized ESR/PWM; and no air flow.

Temperature Sensor Failure:

Failures of temperature sensors are detected by checking whether the temperature reading falls within the expected range. If PWM/ESR is controlled using Ta as the control variable, then when it fails, the control is done as follows. The above said actuator is controlled based on Ti, or the Ta values are estimated using the learned dT (i.e., add dT to Ti value to estimate Ta). During pull down, the valve/PWM can be set to full-open/load for the learned pull-down time (tpd). If Ti also fails at the same time or is not available, the actuator is opened 100% during pull down time and then set to steady-state loading percent (SSLP) after pull-down-time. An alarm is sent to the supervisor upon such a condition.

Degraded Expansion Valve:

If an expansion valve sticks or is off-tuned or is undersized/oversized, the following combinations of the tracked variable can be used to diagnose such problems. N_FL>50% and ER_new %>10% indicate the expansion valve is stuck open or is off-tuned or may be even oversized and thus is flooding the evaporator coil. An alarm is sent upon such a condition. Moreover, SH>20 and N_FL=0% indicate an off-tuned expansion valve or an undersized valve or the valve is stuck closed.

Degraded ESR Valve/PWM Compressor:

A degraded ESR is one that misses steps or is stuck. A degraded PWM Compressor is one whose solenoid is stuck closed or stuck open. These problems are detected in a configuration where defrost is performed by setting the ESR/PWM to 0%. The problem is detected as follows.

If ER_new %>50% before defrost and during defrost Ti<32□F and SH>5□F, then the valve is determined to be missing steps. Accordingly, the valve is closed by another 100% and if Ti and SH remain the same then this is highly indicative that the valve is stuck.

If ER_new %=0 and N_Close is 100% and Ti<32 F and SH>5 F then PWM/ESR is determined to be stuck open. If ER_new %=0 and N-Open is 100% and Ti>32 F and SH>5 F then PWM/ESR is determined to be stuck closed.

Over-Sized ESR/PWM:

If N_Close>90% and 30%<ER_new %<100%, then an alarm is sent for oversized valve/PWM Compressor.

Under-Sized ESR/PWM:

If N_Open>90% and ER-new %=0 and SH>5, then an alarm is sent for undersized valve/PWM Compressor.

No Air Flow:

If N_Open=100%, ER_new %=0, SH<5 F and Ti<25 F and N_FL>50%, then either the air is blocked or the fans are not working properly.

Additionally, these diagnostic strategies can also be applied to an electronic expansion valve controller.

The embodiments which have been set forth above were for the purpose of illustration and were not intended to limit the invention. It will be appreciated by those skilled in the art that various changes and modifications may be made to the embodiments discussed in this specification without departing from the spirit and scope of the invention as defined by the appended claims.

Appendix

Pseudocode for Performing Signal Conditioning

Repeat the following every Ts Seconds:
Read User Inputs:
  Sampling Time (Ts)
  Control Type (P or T)
  Sensor Mode (Avg/Min/Max)
Perform Analog to Digital Conversion (ADC)
  on all (four) Temp. Sensor Channels
  output data as Counts
Digitally Filter Counts
  Ynew=0.75*Yold+0.25*Counts
  output data as Filtered Counts
Convert Filtered Counts to Deg F.
Test if at least one Sensor is within normal operating limits
  e.g. within −40 and +90 F
  If none are within limit—Set Sensor Alarm to TRUE
  Else Perform Avg/Min/Max operation based on Sensor Mode
If Control Type is NOT a T/P Control Type
  Then End Signal Conditioning Routine (until next Ts cycle)
  Else (Control Type is T/P) Do the Following:
Perform ADC on Pressure Sensor Channel
  output data as Counts
Digitally Filter Counts
  Ynew=0.75*Yold+0.25*Counts
  output data as Filtered Counts
Convert Filtered Counts to Psig
Test if pressure Sensor is within normal operating limits
  e.g. within 0 and +200
  If not within limit:
    Set dP=dP Set Pt.
  Else:
    Calculate dP=Pmax-Pmin
Set Sensor Alarm to Conditioned T/dP
End Signal Conditioning Routine (until next Ts cycle)

We claim:

1. A system comprising:
a compressor including a compression chamber;
a first valve in fluid communication with said compression chamber and movable between an open state allowing fluid to said compression chamber and a closed state preventing fluid to said compression chamber;
a second valve in fluid communication with said compression chamber and movable between a first position allowing compressed fluid to leak from said compression chamber to unload said compressor and a second position sealing said compression chamber to load said compressor; and
a controller providing first duty cycle signal to said first valve and a second duty cycle signal to said second valve to cycle said first valve and said second valve at a rate that is faster than a thermal time constant of a load on the system.

2. The system of claim 1, wherein said controller is operable to generate a pulse width modulated signal to control at least one of said first valve and said second valve.

3. The system of claim 2, wherein said pulse width modulated signal is a function of at least one of a physical property and a thermodynamic property of a refrigeration system.

4. The system of claim 3, wherein said physical property and said thermodynamic property include at least one of pressure and temperature.

5. The system of claim 1, wherein at least one of said first valve and said second valve is a solenoid valve.

6. The system of claim 1, wherein said rate is at least two times faster than said thermal time constant.

7. The system of claim 1, wherein said rate is at least four times faster than said thermal time constant.

8. The system of claim 1, further comprising a pressure sensor, said controller being responsive to said pressure sensor for providing a variable duty cycle control signal for modulating at least one of said first valve and said second valve.

9. The system of claim 1, further comprising a temperature sensor, said controller being responsive to said temperature sensor for providing a variable duty cycle control signal for modulating at least one of said first valve and said second valve.

10. The system of claim 1, further comprising a diagnostic module coupled to said controller for monitoring and comparing said rate with at least one predetermined fault value indicative of a system fault condition.

11. The system of claim 10, further comprising an alert module, said alert module responsive to said diagnostic module for issuing an alert signal when said rate bears a predetermined relationship to said fault value.

12. The system of claim 1, further comprising a shell housing said compression chamber.

13. The system of claim 12, further comprising a motor disposed in said shell for driving said compressor.

14. The system of claim 1, wherein said first valve is disposed in a suction line of said compression chamber.

15. The system of claim 1, wherein said first and second duty cycle signals cycle said first and second valves at the same rate.

16. The system of claim 1, wherein said first and second duty cycle signals cycle said first and second valves at different rates.

17. The system of claim 1 wherein at least one of said first and second duty cycle signals is a pulse width modulated signal.

18. A refrigeration system comprising:
a condenser;
an evaporator fluidly coupled to said condenser;
a compressor including a compression chamber and fluidly coupled to said condenser and said evaporator and operable to circulate a fluid therebetween;
a first valve disposed between said evaporator and said compressor and movable between an open state allowing fluid to said compressor and a closed state preventing fluid to said compressor;
a second valve in fluid communication with said compression chamber and movable between a first position allowing compressed fluid to leak from said compression chamber to unload said compressor and a second position sealing said compression chamber to load said compressor; and
a controller providing a first duty cycle signal to said first valve and a second duty cycle signal to said second valve to cycle said first valve and said second valve at a rate that is faster than a thermal time constant of a load on the system.

19. The refrigeration system of claim 18, wherein said controller is operable to generate a pulse width modulated signal to control at least one of said first valve and said second valve.

20. The refrigeration system of claim 19, wherein said pulse width modulated signal is a function of at least one of a physical property and a thermodynamic property of the refrigeration system.

21. The refrigeration system of claim 20, wherein said physical property and said thermodynamic property include at least one of pressure and temperature.

22. The refrigeration system of claim 18, wherein at least one of said first valve and said second valve is a solenoid valve.

23. The refrigeration system of claim 18, wherein said rate is at least two times faster than said thermal time constant.

24. The refrigeration system of claim 18, wherein said rate is at least four times faster than said thermal time constant.

25. The refrigeration system of claim 18, further comprising a pressure sensor, said controller being responsive to said pressure sensor for providing a variable duty cycle control signal for modulating at least one of said first valve and said second valve.

26. The refrigeration system of claim 18, further comprising a temperature sensor, said controller being responsive to said temperature sensor for providing a variable duty cycle control signal for modulating at least one of said first valve and said second valve.

27. The refrigeration system of claim 18, further comprising a diagnostic module coupled to said controller for monitoring and comparing said rate with at least one predetermined fault value indicative of a system fault condition.

28. The refrigeration system of claim 27, further comprising an alert module, said alert module responsive to said diagnostic module for issuing an alert signal when said rate bears a predetermined relationship to said fault value.

29. The refrigeration system of claim 18, wherein said compressor includes a shell.

30. The refrigeration system of claim 29, further comprising a motor disposed in said shell for driving said compressor.

31. The refrigeration system of claim 18, wherein said first valve is disposed in a suction line of said compressor.

32. The system of claim 18, wherein said first and second duty cycle signals cycle said first and second valves at the same rate.

33. The system of claim 18, wherein said first and second duty cycle signals cycle said first and second valves at different rates.

34. The system of claim 18, wherein at least one of said first and second duty cycle signals is a pulse width modulated signal.

* * * * *

UNITED STATES PATENT AND TRADEMARK OFFICE
CERTIFICATE OF CORRECTION

PATENT NO. : 7,654,098 B2  Page 1 of 1
APPLICATION NO. : 11/529645
DATED : February 2, 2010
INVENTOR(S) : Hung M. Pham et al.

It is certified that error appears in the above-identified patent and that said Letters Patent is hereby corrected as shown below:

On the Title Page, Item (56) References Cited,
Foreign Patent Documents,
page 3, reference 23            "JP 719050" should be --JP 7190507--.

Column 16, Line 7               "integral" should be --Integral--.

Column 16, Line 19              "seconds" should be --second--.

Column 17, Line 31              "N-Open" should be --N_Open--.

Column 17, Line 39              "ER-new" should be --ER_new--.

Column 18, Line 41              After "providing," insert --a--.

Signed and Sealed this

Thirtieth Day of November, 2010

David J. Kappos
*Director of the United States Patent and Trademark Office*